US012780337B2

(12) United States Patent
Ilzkovitz et al.

(10) Patent No.: US 12,780,337 B2
(45) Date of Patent: Nov. 3, 2026

(54) CRAWLER TYPE VEHICLE CONFIGURED FOR TRAVELING ALONG A STRUCTURE, METHOD OF HANGING/SUSPENDING THE VEHICLE FOR CARRYING OUT CRAWLER-LIKE TRAVELING MOTION ALONG THE STRUCTURE, AND USE OF AT LEAST ONE CRAWLER TYPE DRIVE UNIT FOR ACTIVE TRAVELING MOTION

(71) Applicant: Ceilix AG, Pullach i. Isartal (DE)

(72) Inventors: Michel Ilzkovitz, Brussels (BE); Guillaume Fau, Tourinnes la Grosse (BE); Michael Torsten Siedel, Bad Münstereifel (DE)

(73) Assignee: CEILIX AG, Pullach i. Isartal (DE)

( * ) Notice: Subject to any disclaimer, the term of this patent is extended or adjusted under 35 U.S.C. 154(b) by 23 days.

(21) Appl. No.: 18/852,871

(22) PCT Filed: Mar. 28, 2023

(86) PCT No.: PCT/EP2023/058060
§ 371 (c)(1),
(2) Date: Sep. 30, 2024

(87) PCT Pub. No.: WO2023/186938
PCT Pub. Date: Oct. 5, 2023

(65) Prior Publication Data

US 2025/0229853 A1 Jul. 17, 2025

(30) Foreign Application Priority Data

Mar. 29, 2022 (EP) .................................... 22165188
Mar. 29, 2022 (EP) .................................... 22165205
(Continued)

(51) Int. Cl.
*B62D 57/024* (2006.01)
*B62D 55/075* (2006.01)
*B62D 55/104* (2006.01)

(52) U.S. Cl.
CPC ......... *B62D 57/024* (2013.01); *B62D 55/075* (2013.01); *B62D 55/104* (2013.01)

(58) Field of Classification Search
CPC ................ B62D 55/075; B62D 55/104; B62D 55/0655; B62D 57/024; B65G 1/0492
(Continued)

(56) References Cited

U.S. PATENT DOCUMENTS

2018/0050747 A1 2/2018 Kazakov

FOREIGN PATENT DOCUMENTS

CN 110228541 B 1/2021
DE 2020100256 U1 5/2020
(Continued)

*Primary Examiner* — Valentin Neacsu
*Assistant Examiner* — Felicia L. Brittman-Alabi
(74) *Attorney, Agent, or Firm* — Miller Canfield

(57) ABSTRACT

Crawler type vehicle configured for travelling in a suspended manner, exhibiting—a plurality of suspension elements configured for suspending the vehicle and configured for coupling the vehicle to a ceiling structure, —at least one first drive unit configured for circumferential motion and accommodating a first circumferential track and a second circumferential track having a different circumferential shape/contour than the first circumferential track, wherein the suspension elements are attached to the first circumferential track at predefined first longitudinal positions corresponding to a predefined raster, wherein the vehicle is configured for moving along the ceiling structure by decoupling a subset of the plurality of suspension elements from resp. coupling them into the ceiling structure when the
(Continued)

suspension elements are guided along the two circumferential tracks by the circumferential motion.

13 Claims, 35 Drawing Sheets

(30) Foreign Application Priority Data

May 5, 2022 (EP) ..................................... 22171776
Sep. 1, 2022 (EP) ..................................... 22193445

(58) Field of Classification Search
USPC ........................................................... 180/9.1
See application file for complete search history.

(56) References Cited

FOREIGN PATENT DOCUMENTS

DE 202020100256 U1 * 5/2020 ............. B66B 9/022
JP 1984-227570 A2 12/1984

* cited by examiner 10
11

20,
20a
G13.2
G13.1
1.2

12a
12b
P13

12a
12b

XZa
XZb 20,
20b

CRAWLER TYPE VEHICLE CONFIGURED FOR TRAVELING ALONG A STRUCTURE, METHOD OF HANGING/SUSPENDING THE VEHICLE FOR CARRYING OUT CRAWLER-LIKE TRAVELING MOTION ALONG THE STRUCTURE, AND USE OF AT LEAST ONE CRAWLER TYPE DRIVE UNIT FOR ACTIVE TRAVELING MOTION

CROSS-REFERENCE TO RELATED APPLICATIONS

This invention claims priorities of European patent applications No. EP22165188.8, filed Mar. 29, 2022, No. EP22165205.0, filed Mar. 29, 2022, No. EP22171776.2, filed May 5, 2022 and No. EP22193445.8, filed on Sep. 1, 2022.

TECHNICAL FIELD

The present invention refers to crawler type vehicles, especially ceiling vehicles, configured for traveling in a suspended manner, e.g. headlong at a ceiling structure. Further, the present invention refers to a method for suspending (especially hanging) and actively driving such a crawler type vehicle. In particular, the present invention refers to devices and methods according to features of the enclosed independent claims.

BACKGROUND

In prior art, multiple design philosophies have already been established in context with provision of vehicles which shall be able to ensure a predefined traveling motion also in rough terrain or in context with unpredictable reaction forces or at high inclination or even in an overhead arrangement. The present invention focuses on those philosophies departing from the idea that the vehicle or transport medium should engage/interact in predefined manner with a predefined structure or underground, be it in an arrangement on the ground/floor (e.g. ground vehicles), be it a structure at a wall or at the ceiling (e.g. overhead cranes, wall crawling robots) e.g. in a storehouse or in machinery hall. Some ideas of provision of reliable contact between the underground structure and the vehicle have already been published in context with diagnosis and parameter measurement in nearly inaccessible areas or systems (e.g. ductwork, canal systems), including magnetic adhesion/interference. Nonetheless, there is a need for vehicles being capable of providing, by interacting with a predefined structure, both a predefined traveling motion and a high accuracy in positioning (positional accuracy) in very reliable manner, preferably irrespective of the kind of underground or wall constitution, wherein the predefined structure should preferably be provided in very flexible and varied manner to many kinds of underground or wall or ceiling contour/geometry.

The skilled person may differentiate between those vehicles which are provided for moving on the underground and those vehicles which are provided for moving along a ceiling structure, especially since the latter have to be suspended in secure manner also, in order to avoid going down. Therefore, there might be different approaches as to the kinematics ensuring interaction/engagement at the structure's interface.

SUMMARY

It is an object of the present invention to provide for a (ceiling) vehicle and an active driving mechanism which respectively allows for very reliable and accurate active traveling/driving motion and positioning of the vehicle with respect to the structure in two directions, especially also with respect to an underground structure or to a wall structure or to any further kind of support structure (not only at a ceiling). In particular, the object may also include provision of an appropriate coupling mechanism for reliably coupling the vehicle with the structure. Also, the object of the present invention may further include reliable hanging/suspending methods and active driving methods for movably suspending such a vehicle on/at a structure in two directions, e.g. in context with logistic tasks in suspended/hanging manner at a ceiling structure.

The object of the present invention is solved by the features of the independent main claims. Advantageous features are indicated in the subclaims. If not explicitly excluded, the teachings of the subclaims can be combined arbitrarily with the teachings of the main claims and the subclaims.

According to a first aspect, the present invention concerns kinematics of suspension elements being de-/coupled by a driving motion along circumferential tracks. In that context the present invention may also provide for a vehicle and (optionally) an active driving mechanism which respectively allows for very reliable and accurate traveling/driving motion and positioning of the vehicle with respect to the structure in at least two directions in context with logistic tasks, especially also with respect to a cargo or load functionality, in particular in an arrangement at a ceiling or in an overhead arrangement (upside down). In particular, the present invention also provides for a coupling mechanism allowing for reliably coupling the vehicle with a support structure for transferring a predefined driving motion in at least two spatial dimensions/directions (2D) in very reliable manner to the support structure, in order to allow for reliable positioning of the vehicle.

In particular, the object is therefore solved by a crawler type vehicle configured for traveling in a suspended manner especially headlong at a ceiling structure, wherein the vehicle exhibits:

- a plurality of suspension elements configured for suspending the (ceiling) vehicle and configured for coupling the (ceiling) vehicle to the (ceiling) structure,
- at least one first drive unit configured for circumferential motion and accommodating a first circumferential track and a second circumferential track having a different circumferential shape/contour than the first circumferential track, wherein the suspension elements are attached to the first circumferential track at predefined first longitudinal positions corresponding to a predefined raster, wherein the ceiling vehicle is configured for moving along the ceiling structure by decoupling a subset of the plurality of suspension elements from resp. coupling them into the ceiling structure when the suspension elements are guided along the two circumferential tracks by the circumferential motion.

According to the present disclosure, when it is referred to "structure" or "ceiling structure", likewise, a structure which may also extend on the ground or along a wall or on an inclined plane (or the like) can be designated. The present invention can preferably be applied for ceiling vehicles being arranged at resp. traveling along a ceiling structure, and in addition, the present invention also allows for any motion along any structure with alternative orientation and/or arrangement. Thus, referring to a "structure" or "ceiling structure" includes reference to any other "structure" exhibiting the features allowing for coupling with/to the inventive vehicle and de-/coupling kinematics.

According to the present disclosure, when it is referred to "vehicle" or "ceiling vehicle", the disclosure also generally refers to crawler type vehicles and its relative spatial arrangement or traveling motion (e.g. also on the ground or on an inclined plane or at the wall).

According to the present disclosure, when it is referred to "circumferential track", the disclosure also generally refers to closed loop guidings and lines and predefined contours along which the suspension elements are guided and/or driven.

According to the present disclosure, when it is referred to "profiles" or "T-profiles", the disclosure also generally refers to different kinds of profiles like e.g. l-profiles or L-profiles which may provide for advantageous/favourable arrangements in individual applications.

According to one embodiment, the suspension elements are coupled with the ceiling structure based on form fit (form closure, positive locking), especially exclusively form fit (no force-fit coupling). According to the invention, it has been found that form fit can advantageously be provided by wheels or any other bearing points at a free end of the respective suspension element for being in contact with T-profiles or other kinds of profile rails of the ceiling structure (e.g. C-profiles or L-profiles or l-profiles). It has been found that form fit provides for a preferred/superior manner of coupling in many circumstances, especially in comparison with magnet coupling or the like. Depending on the kind of drive unit or vehicle or spatial orientation of the structure, the skilled person can decide which kind of profile (e.g. T-profile) is most appropriate.

Also, depending on the orientation of the structure, the drive units' traveling motion (as to its spatial direction resp. locomotion) can be individual. The skilled person may implement the present invention for different kinds of spatial traveling motions, especially without any limitation in 2D or even 3D degrees of freedom.

Also, the shape/contour of respective circumferential tracks can be individual, i.e., the skilled person can decide e.g. about a certain degree (radius) of curvature in specific sections of the respective circumferential track. For example, each track exhibits at least three different guide/rail sections, namely: a first (linear) section in which each suspension element is engaged with the profile, wherein the suspension element performs a linear motion; and at least one second (curved) section in which each suspension element performs a de-/coupling motion (wherein each track may exhibit two second sections being arranged oppositely); and a third (linear) section in which the suspension elements are returned to couple again with the profile (for continuous, circumferential motion and engagement process). Thereby, first and second tracks may define the trajectory of the respective free ends of the suspension elements especially exhibiting at least one roller being attached to the respective suspension element by any appropriate means (e.g. by a gliding/rolling contour, a chain drive, a timing belt, or any likewise mechanism or mechanical feature) which is configured for predefining a specific contour and for guiding the free ends resp. the rollers to follow that contour of the tracks.

According to a second aspect, the present invention concerns an application at a ceiling, wherein suspension can specifically be provided in view of active 2D traveling motion along the ceiling structure.

In particular, the above mentioned object can also be solved by a crawler type ceiling vehicle configured for traveling in at least two spatial directions in a suspended manner headlong at a ceiling structure defining a first of said spatial directions, the traveling motion having at least two degrees of freedom, wherein the ceiling vehicle exhibits: a plurality of suspension elements configured for suspending the ceiling vehicle and configured for coupling the ceiling vehicle to the ceiling structure such that the suspension elements can be moved/driven (e.g. rolled, glided) along the ceiling structure in said first spatial direction, and at least two drive units, with at least one crawler track-like drive unit (referred to as first drive unit) accommodating a first circumferential track and a second circumferential track and configured for circumferential driving/guiding motion, wherein the suspension elements are attached to the first circumferential track at predefined first longitudinal positions corresponding to a raster defined by the ceiling structure in a second spatial direction, wherein the second spatial direction is orthogonal to the first spatial direction, wherein the suspension elements engage the second circumferential track at predefined second longitudinal positions, wherein the first and second tracks have a different shape/contour, wherein the first and second tracks are (fixedly) arranged with respect to each other in such a manner that the suspension elements are decoupled from resp. coupled into the ceiling structure by a/the (crawler track-like) circumferential motion provided by the first drive units and first or second tracks, and with at least one (second) drive unit configured for moving the crawler type vehicle in said first spatial direction, wherein the drive units are connected to a motor, especially to an electric motor.

The present invention allows for overcoming limitations of standard overhead cranes such as gantry cranes where only one hoist can operate in the defined workspace.

The vehicle is configured for moving along the ceiling structure in the structure's second spatial direction by decoupling a subset of the plurality of suspension elements from resp. coupling them into the structure, especially when said subset of suspension elements are guided along a curved section of the circumferential tracks. It should be noted that according to the invention, the term "spatial direction" designates a direction in space, thus, the term "spatial direction" may comprise a motion along a space axis in both directions along the space axis. Thus, the term "in a first/second spatial direction" designates a one-dimensional motion (which is bidirectional, i.e., back and forth) having one degree of freedom (especially linear motion). Consequently, a/the term "two-dimensional motion" refers to a motion having two degrees of freedom (especially linear motion in the first spatial direction and in the second spatial direction defined by the structure, the second spatial direction e.g. being orthogonal to the first spatial direction, also in bidirectional manner). The spatial directions are defined via the structure to which the crawler type (ceiling) vehicle is connected, wherein the structure exhibits a plurality of preferably parallel profiles, along which the "first spatial direction" is defined and orthogonal (but remaining in the plain of the structure) to which the "second spatial direction" is defined.

It should be noted that according to the invention, the term "drive unit" especially may designate the whole assembly of drive components and kinematic components required for realizing the desired traveling motion. Also, the drive unit may further comprise a case or chassis accommodating structural parts and elements for arrangement of any parts of the drive section. Further, the drive unit may also comprise structural parts or supports or beams for mounting and support of any hoist component or passenger/cargo transport components.

The shape or dimension of the at least one first drive unit (and also of the circumferential tracks) can be defined individually according to specific applications. E.g., the cross-section geometry of the at least one first drive unit is in the shape of a racecourse (parallel longitudinal sections and opposite semicircle sections). But, alternatively, the cross-section geometry can also be circular or elliptical for example. The vehicle may comprise different kinds of power units, drives, motors, and actuators, optionally not only for the drive units, but also for further functions as e.g. winch or hoist functions. Generally, the vehicle can be provided as an active vehicle exhibiting at least two motors interacting with the driving mechanism resp. with the suspension elements. In particular, the vehicle exhibits at least one power unit or motor for each drive unit, e.g. an electric motor which is coupled to an axis of rotation of a gear unit interacting with the respective circumferential track or an electric motor interacting with the wheels of the suspension elements via the at least one second drive unit, in order to allow for motorized motion in at least two spatial directions, thus, the wheels can be driven by any drive to actively drive along the profile rails. Also, the vehicle resp. the at least two drive units may comprise an energy storage unit, especially a rechargeable battery pack, providing energy to the at least two drive/motor, irrespective of any external energy supply (power to motors for driving the vehicle resp. the tracks resp. the guiding motion along the tracks). In particular, the vehicle may also exhibit at least one hoist (hoist unit) and a traction mechanism configured for lifting loads. E.g., the hoist unit can be fixed to and supported by the at least one first drive unit.

Each power unit, drive, motor and/or actuator of the vehicle can be coupled to a control unit of the vehicle. In particular, the control unit may control the type/kind of motion, and the control unit may also control e.g. a lifting action of a hoist unit e.g. in context with cargo tasks or logistic tasks in general. For example, the vehicle may exhibit two or three drive units which can be arranged in predefined lateral distance to each other (e.g. defined/connected via cross-beams or the like), and in case the vehicle is driven in active manner, each drive unit may exhibit at least one drive/motor for actively driving the suspension elements along the circumferential tracks or the vehicle in the second spatial direction, and these drives/motors can be controlled depending on each other, e.g. via the speed of rotation. Thus, a traveling direction can be controlled, especially in combination with actively driven wheels of the suspension elements being driven along the profile rails of the ceiling structure.

In other words, in the present disclosure, the term “drive unit” especially refers to a unit accommodating kinematics allowing for traveling motion of the vehicle.

In the following, advantageous aspects of the claimed invention are explained and further below, preferred modified embodiments of the invention are described.

Explanations, in particular on advantages and definitions of features, are basically descriptive and preferred, but not limiting examples. If an explanation should be understood as limiting explanation/expression, this is expressly mentioned.

According to one embodiment the crawler type (ceiling) vehicle exhibits a plurality of suspension elements configured for suspending the (ceiling) vehicle and configured for coupling the (ceiling) vehicle to the (ceiling) structure, at least one first drive unit configured for circumferential motion and accommodating a first circumferential track and a second circumferential track having a different circumferential shape/contour than the first circumferential track, wherein the suspension elements are attached to the first circumferential track at predefined first longitudinal positions corresponding to a predefined raster, wherein the (ceiling) vehicle is configured for moving along the (ceiling) structure by decoupling a subset of the plurality of suspension elements from resp. coupling them into the (ceiling) structure when the suspension elements are guided along the two circumferential tracks by the circumferential motion.

According to one embodiment the crawler type (ceiling) vehicle further exhibits at least one second drive unit configured for enabling locomotion of the ceiling vehicle in at least two spatial directions, namely a first spatial direction being predefined by the structure and a second spatial direction being defined by the guiding/driving motion of the at least one first drive unit, wherein the second spatial direction is orthogonal to the first spatial direction, wherein the second drive unit is configured for locomotion of the vehicle in the first spatial direction providing for at least two-dimensional locomotion capability of the vehicle, wherein the respective suspension element exhibits at least one wheel which is arranged and configured for being guided along the structure, especially on a wheel tread of a respective/corresponding profile of the structure, at least two individually controllable motors, wherein at least one first drive unit and at least one second drive unit is connected to at least one motor, and wherein the motor for the first drive units and the second drive units are different, providing for active two-dimensional traveling capability of the vehicle. The first drive units of the vehicle can be scaled up in number; e.g., the vehicle exhibits three first drive units each being based on the same kinematic concept, but at least one of these drive units providing for mirror-inverted type/manner of de-/coupling kinematics.

The present invention allows for advantageous realization of an omniwheel behaviour of the vehicle, providing for at least two-dimensional locomotion capacities of the vehicle.

According to one embodiment the at least one first drive unit of the crawler type vehicle is configured for enabling a closed loop trajectory of the suspension elements, the first and second circumferential tracks are shaped in such a manner that the suspension elements are de-/coupled from/into the structure only when passing a curved section of the tracks, the suspension elements are fixedly attached/coupled by means of a first pulley to/with the first circumferential track, wherein the suspension elements are guided within the second circumferential track by means of a second pulley respectively, wherein the first and second pulley preferably are arranged at a lever arm of the respective suspension element, wherein the respective suspension element preferably has an L-shape, and/or wherein each suspension element exhibits a first pulley and a second pulley arranged in longitudinal distance with respect to the first pulley at a lever arm of the respective suspension element, wherein the suspension element is coupled to the first and second tracks via the first and second pulleys, and/or wherein each suspension element exhibits a lever arm accommodating/supporting a/the pulley guided by the second track, wherein the pulley is arranged at a free end of the lever arm, and wherein in a linear section of the track, the lever arm is pointing in the driving/traveling direction, at least roughly, wherein the suspension elements are connected to each other by means of longitudinal connecting elements, especially by longitudinal connecting elements being connected at the axis of a/the first pulley of the respective suspension element, thereby forming a closed loop of interrelated suspension elements distanced to each other in the predefined raster, the first circumferential track exhibits a chain or is provided/ defined by a chain forming a closed loop of interrelated chain elements connecting the suspension elements, wherein the vehicle exhibits a plurality of counter bearings, especially configured and arranged for frontally interacting with the ceiling structure, wherein the plurality of counter bearings are preferably coupled to/with the first circumferential track, especially coupled to chain elements of the first circumferential track;

wherein the vehicle exhibits a further first drive unit accommodating further circumferential tracks, wherein a plurality of further suspension elements are attached to the further circumferential tracks in predefined longitudinal positions corresponding to a/the predefined raster and are configured for suspending the vehicle and for coupling the vehicle to the structure, especially such that the vehicle is secured with respect to opposite directions at the structure, wherein the vehicle exhibits further suspension elements which are attached to further circumferential tracks, wherein the suspension elements and the further suspension elements momentarily engaging the structure are securing/blocking the vehicle at the structure with respect to the driving/traveling direction and opposite thereto, and/or wherein the vehicle exhibits a further drive unit which exhibits the same configuration as a/the first drive unit but with mirror-inverted arrangement of the further suspension elements and further circumferential tracks, wherein the further suspension elements are guided/driven in a direction opposite to the guiding direction of the suspension elements of the first drive unit, especially such that both the respective suspension elements and further suspension elements are simultaneously de-/coupling to/from the structure, the at least one first drive unit is configured for lifting the respective suspension element out of the structure in an unloaded state, especially such that the at least one first drive unit provides for both decoupling kinematics for a subset of momentarily unloaded suspension elements and suspension of the vehicle by a subset of momentarily loaded suspension elements at the same time; and/or wherein the at least one first drive unit has a substantially plane configuration; and/or wherein the vehicle exhibits at least two first drive units arranged in parallel to each other; and/or wherein the circumferential tracks are respectively guided/driven in a plane, extending in two-dimensional manner; and/or wherein the at least one first drive unit is coupled by means of at least three suspension elements, and/or wherein the respective suspension element has an L-shape which provides for two arms defining the relative arrangement of a/the wheel and first and second pulleys of the respective suspension element. This configuration is favourable in view of scaling, allows for providing, along a rectilinear section of the tracks, a section in which suspension of the vehicle can be secured by scalable number of suspension elements. Further, this arrangement allows for high accuracy of the predefined path and amount of the predefined motion of a free end (or of a/the wheel) of the respective element. The lever arm pointing (roughly) in the driving/traveling direction (second spatial direction) allows for effecting a great effective length of the lever arm section between first and second pulley, thereby ensuring considerable pivot motions for de-/coupling kinematics. Also, this configuration allows for adjusting the shape/contour of the track by means of a chain tensioning device or other kinds of deviating point/pulley. In particular, the first circumferential track can be defined by a chain connecting the suspension elements. According to the present disclosure, the term "chain" may also refer to a belt or cable or any other circumferential driving element that allows to follow/constrain to the circumferential track(s). The skilled person may decide which configuration of the chain is most appropriate in/for an individual application. The plurality of counter bearings allow for securing the vehicle's position with respect to the further (second) spatial direction (normal force being exerted on the structure in case the vehicle is arranged in a headlong manner upside down or at an inclined plane). In particular, the plurality of counter bearings may/can provide for a counter force drive module (counter force unit) which allows/facilitates even more secure positioning and suspension of the vehicle, e.g. on an inclined plane or in an overhead arrangement (upside down). The free ends of the counter bearings can be configured in dependence on the type/shape of the (ceiling) structure; e.g., the free ends of the counter bearings exhibit at least one wheel or pulley. A further first drive unit accommodating further circumferential tracks configured for synchronous circumferential motion of further suspension elements facilitates scaling up and favours configurations for vehicles having high stability and security requirements. Further first drive units also provide for high security and even self-locking suspension. The closed loop of interrelated suspension elements distanced to each other in the predefined raster ensures accurate relative arrangement of the plurality of suspension elements with respect to each other. Each longitudinal connecting element preferably exhibits the shape of a rod or stick or small lever arm. In other words: The plurality of longitudinal connecting elements may provide for a closed loop of interrelated elements which form a kind of chain or the like which is guided/driven along the circumferential track(s). A further (first) drive unit with mirror-inverted arrangement advantageously fits with a ceiling structure being made of or being provided by T-profiles or T-shaped support elements (especially T-shaped ceiling beams). The provided kind of de-/coupling kinematics also provides for a quite energy efficient and force-efficient manner of driving/traveling/advancing. Also, minimising forces and momentum in context with the de-/coupling process also favours potentially very fast crawling motion(s) even in case the vehicle exhibits considerable weight or has to lift considerable loads. The parallel arrangement of multiple first drive units that have a substantially plane configuration in a lateral view (side-face) favours implementation of two or even three first drive units in a quite narrow/slim arrangement, respectively. The guiding/driving of circumferential tracks in a plane, extending in two-dimensional manner favours implementation of a linear traveling motion combined with a motion along the ceiling structure, orthogonal to the traveling motion of the circumferential tracks. The coupling of the vehicle by means of at least three suspension elements provides for distributing any forces and momentum via a plurality of suspension elements, thereby ensuring a good security and stability level. The L-shape of the configuration allows for a robust design; also, the suspension elements can easily be designed individually depending on specific applications and specific ceiling structures, by adapting the design of the lever arms.

According to one embodiment the vehicle comprises at least one holonomic wheel being part of the second drive unit. This provides active motion in the first spatial direction defined by the structure via the second drive unit and the motor connected thereto, and passive motion in the second spatial direction.

According to the present invention, a holonomic wheel is a wheel whose wheel tread consists of rollers whose axes of rotation are at an angle to the axis of rotation of the main wheel. The absolute angle between the axes can for example be any angle between 5 and 90 degrees, especially 45 degrees. This angle has to be regarded when controlling the at least two motors, since the movement of the first drive units and the second drive unit are not independent in the case that the angle of the rollers to the wheel is different than 90 degrees. An angle smaller than 90 degrees can result in advantageous configurations regarding the traction of the holonomic wheel with the profiles of the structure. In case the angle is smaller it is possible to place more rollers with the same diameter around the wheel, which enhances traction transmission and can compensate for gaps in the traction transmission of a single omniwheel.

According to one embodiment the holonomic wheel is disc shaped and comprises a plurality of equally distributed rollers around its circumference, such that it allows for traction control in the first spatial direction and is not affected by a motion in the second spatial direction. In this case the angle between the rollers and the wheel is 90 degrees. This allows for easier control of the configuration.

According to one embodiment the crawler type vehicle comprises a holonomic wheel set consisting of at least two coaxially arranged holonomic wheels, wherein the wheel set is connected to the second drive unit. The holonomic wheels are preferably disc shaped and have a thickness that is half the width of the profiles of the structure, such that there is room for at least two holonomic wheels of the holonomic wheelset to interact with one profile (rail) of the structure. This configuration enhances the traction of the disc shaped holonomic wheels.

According to one embodiment each of the coaxially arranged holonomic wheels has a predefined offset in the azimuthal direction in respect to their adjacent holonomic wheels. It is preferred that if one holonomic wheel comprises n rollers, that are equally distributed around the circumference of the wheel, each wheel is offset by 180/n degrees with respect to its neighbours. This way, it can be ensured that there is always at least one wheel of the wheelset that is in contact with the profile of the structure such that slip of the second drive unit is prevented.

According to one embodiment the holonomic wheel(s) is/are connected to a return mechanism that applies a force to the holonomic wheel(s) pressing it/them against the structure. This configuration enhances traction of the holonomic wheel on the profiles (rails) of the structure additionally.

According to one embodiment the vehicle comprises at least one wide elongated gearing wheel for meshing with a defined raster in the first spatial direction, wherein the gearing wheel is connected to the second drive unit. The wide elongated gearing wheel, also called “spur gear”, conditions an additional raster, a “sub raster” in the profile of the structure, such that the teeth of the gear mesh with the sub raster. When the spur gear is turned via the motor and the second drive unit, the vehicle pulls itself forward in the first spatial direction.

According to one embodiment the elongated gearing wheel is tapered at the ends to allow a smooth transition into the additional raster. This mitigates the risk of being stopped or causing damage by imperfect alignment with the sub raster elements.

The above mentioned object is also solved by a crawler type vehicle arrangement (especially ceiling vehicle arrangement) comprising at least one vehicle (especially ceiling vehicle) as described above and a/the structure (especially ceiling structure) exhibiting a plurality of profiles (especially (parallel) T-profiles) defining a/the raster of the structure, wherein the raster of the relative arrangement of the suspension elements corresponds to the structure’s raster, wherein a subset of the suspension elements (namely those momentarily engaging the profiles) are arranged/configured for being guided/driven along the profiles in a (first) spatial direction being defined by the structure, the vehicle’s traveling motion thereby having at least two degrees of freedom. This provides for above mentioned advantages, especially in view of an optimized form fit at the coupling interface between suspension elements and the structure.

The above mentioned object is also solved by a crawler type vehicle arrangement comprising at least one crawler type vehicle with a spur gear and a structure exhibiting a plurality of first profiles defining a raster of the structure in a first spatial direction, wherein the plurality of profiles each exhibit second profiles defining a raster of the structure in a second spatial direction, wherein the suspension elements are configured for being guided along the first profiles in the first spatial direction being defined by the structure, the vehicle’s traveling motion having at least two degrees of freedom, and wherein the gearing wheel is configured for meshing with the second profiles, such that the crawler type vehicle can move omnidirectionally via the at least two individually controllable drive units.

The above mentioned object is also solved by a method of hanging/suspending a crawler type (ceiling) vehicle at/from a (ceiling) structure for traveling in a suspended manner headlong the (ceiling) structure, meaning actively driving the crawler type ceiling vehicle, especially a crawler type ceiling vehicle as described above, wherein the ceiling vehicle is suspended by means of a plurality of suspension elements coupling the (ceiling) vehicle to the (ceiling) structure, wherein a circumferential guiding/driving motion is provided by at least one first drive unit connected to a motor_accommodating first and second circumferential tracks having a different circumferential shape/contour, wherein the suspension elements are attached to the first circumferential track at predefined first longitudinal positions corresponding to a raster defined by the (ceiling) structure, wherein the (ceiling) vehicle is suspended such that it can move along the (ceiling) structure by decoupling a subset of the plurality of suspension elements from resp. coupling them into the ceiling structure when the suspension elements are guided along the circumferential tracks by the circumferential motion (guiding/driving motion), and wherein a further motor is connected to a second drive unit such that the vehicle can actively move in two dimensions along the structure. This provides for above mentioned advantages, especially in view of a high degree of autonomy (movability) and security of any motion along the ceiling structure.

The above mentioned object can also be solved by a method of providing a two-dimensional crawler-like traveling motion by means of a crawler type ceiling vehicle being suspended headlong at a ceiling structure defining a first spatial direction, especially by means of a crawler type ceiling vehicle as described above, wherein a plurality of suspension elements suspending the ceiling vehicle are momentarily coupled with the ceiling structure such that the suspension elements can be moved/driven via a motor along the ceiling structure in said first spatial direction, wherein a circumferential guiding/driving motion is provided by at least one drive unit (especially crawler track-like) accommodating a first circumferential track and a second circumferential track, wherein the suspension elements are attached to the first circumferential track at predefined first longitudinal positions corresponding to a raster defined by the ceiling structure in a second of said spatial directions, wherein the suspension elements engage the second circumferential track at predefined second longitudinal positions, wherein the first and second tracks have a different shape/contour, wherein the suspension elements are decoupled from resp. coupled into the ceiling structure by a/the circumferential guiding/driving motion of the at least one drive unit or tracks, wherein during the circumferential guiding/driving motion in second spatial direction, the first and second tracks remain in (fixed) relative arrangement with respect to each other, especially in parallel arrangement.

The above mentioned object can also be solved by a method of providing a crawler-like traveling motion or positioning by means of a crawler type vehicle being coupled to a structure having a predefined raster, especially by means of a crawler type vehicle as described above, wherein a plurality of suspension elements of the vehicle are momentarily coupled to the structure, wherein de-/coupling kinematics comprising a first circumferential track and a second circumferential track having a different circumferential shape/contour than the first circumferential track at least in curved sections of the track(s) provide for respectively de-/coupling a subset of the suspension elements to/from the structure when guiding/driving the suspension elements along a curved section of the circumferential tracks, especially by means of at least one drive unit (especially crawler track-like) accommodating the first and second circumferential tracks, wherein the suspension elements are attached to the first circumferential track at predefined first longitudinal positions corresponding to the raster of the structure, wherein the suspension elements are guided in/by the second circumferential track at respective second longitudinal positions being longitudinally offset with respect to the respective first longitudinal position, wherein the de-/coupling kinematics provide for both a first (vertical) motion orthogonal to the traveling/driving direction of the circumferential tracks and a second motion pivoting each suspension element when it is guided/driven along a/the (momentary) curved section of the circumferential tracks by the circumferential guiding/driving motion.

The circumferential motion is transmitted/transferred by the suspension elements momentarily engaging the ceiling structure. This also allows for distributing any forces and momentum via all suspension elements momentarily engaging the ceiling structure. In other words: Scaling can easily be done via the length of the vehicle. It should be noted that action can be provided by the (respective) drive unit(s), and only reaction is provided by the ceiling structure. There is no need of any active component or drive acting within the ceiling structure.

The guiding/driving motion is provided by first drive units, wherein one of the first drive units provides for a circumferential motion of a first subset of the suspension elements on a first closed loop trajectory (especially in a first direction) and another one of the first drive units provides for a circumferential motion of a second subset of the suspension elements on a second closed loop trajectory (especially in a second direction which moving direction is optionally the same or different from the first closed loop trajectory, especially opposite to the first closed loop trajectory). This arrangement also favours a secure manner of coupling, wherein the vehicle can be secured in different spatial directions.

The above mentioned object is also solved by a computer program comprising instructions which, when the program is executed by a computer, cause the computer to execute the steps of the method described above in context with provision and control of the circumferential guiding/driving motion, especially by controlling at least one of the first drive units. This provides for above mentioned advantages, especially in view of remote control of the vehicle.

The above mentioned object is also solved by use of at least one crawler type drive unit accommodating first and second circumferential tracks having different circumferential shapes/contours, for hanging/suspending and actively driving a crawler type ceiling vehicle to travel in a suspended manner especially headlong at a ceiling structure, especially for hanging/suspending and actively driving a crawler type ceiling vehicle as described above, especially in a method as described above, wherein the ceiling vehicle is suspended by means of a plurality of suspension elements coupling the ceiling vehicle to the ceiling structure, wherein the suspension elements are attached to the first circumferential track at predefined first longitudinal positions corresponding to a raster defined by the ceiling structure, wherein a/the circumferential guiding/driving motion is provided by the at least one of the first drive units such that the vehicle moves along the ceiling structure by decoupling a subset of the plurality of suspension elements from resp. coupling them into the ceiling structure when the suspension elements are guided/d riven along the circumferential tracks in second spatial direction. This provides for above mentioned advantages, especially also in view of allowing for a simple and cost-effective ceiling structure. In other words: The at least one crawler type drive unit provides for both de-/coupling kinematics and suspension of the vehicle at the same time (simultaneously). In that context, using battery technology (e.g. embedded in the vehicle to supply energy to the vehicle, e.g. for powering an on-board controller, hoist(s) and motor(s) for locomotion), may render the vehicle even more autonomous.

BRIEF DESCRIPTION OF THE DRAWINGS

These and other aspects of the present invention will also be apparent from and elucidated with reference to the embodiments described hereinafter. Individual features disclosed in the embodiments can constitute, alone or in combination, an aspect of the present invention. Features of different embodiments can be carried over from one embodiment to another embodiment. In the drawings.

DETAILED DESCRIPTION

Figure 1A:
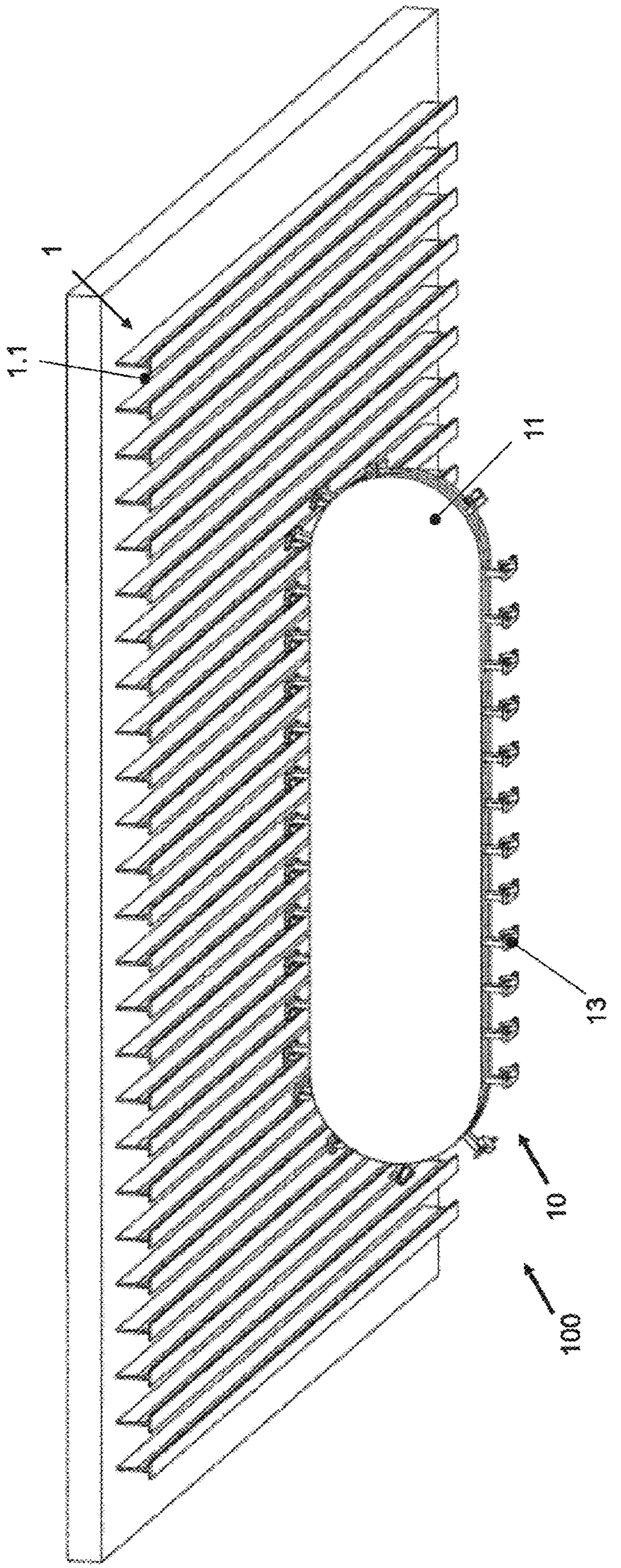
FIGS. 1A, 1B, 1C, 1D, 1E, 1F, 1G, 1H, 1J, 1K, 1L, 1M, 1N, 1O show in perspective views and in side views components (first drive unit) of a ceiling vehicle.

First, the reference signs are described in general terms; individual reference is made in connection with respective figures.

The present invention provides for a vehicle 10, especially a ceiling vehicle 10, having at least one drive unit 11 (especially crawler track-like), especially a first drive unit 11*a* and a further first drive unit 11*b* and optionally also a further first drive unit 11*c*. The vehicle 10 is configured for traveling along a ceiling structure 1 exhibiting a predefined raster 1*a* which is, e.g., defined by T-profiles resp. T-rails 1.1 or any such profile rails. The profiles 1.1 exhibit at least one wheel tread 1.2, and optionally, a power rail 1.3 providing for energy supply can be arranged at the profiles. The vehicle 10 is coupled to the structure 1 and suspended via a plurality of suspension elements 13 (e.g. each including at least one chain element). A crawler type ceiling vehicle arrangement 100 is composed of at least one ceiling vehicle 10 and at least one ceiling structure 1.

The at least one drive unit 11 provides for a drive mechanism 11.1 with at least one motor or actuator, which allows for circumferential motion of the suspension elements 13 along circumferential tracks 12, namely simultaneously along a first and a second circumferential track 12*a*, 12*b*, which tracks exhibit individual shapes/contours XZa, XZb. Preferably, the tracks only extend two-dimensionally (2D), i.e. in a plane, and the shape is different at least in curved sections of the tracks. Each track 12*a*, 12*b* exhibits a parallel/linear section 12*p* (resp. two parallel sections) and a redirection/curved section 12*r* (resp. two curved sections). A lateral area resp. surface shell 11.2 of the at least one drive unit is preferably flat, plane, even, respectively on each lateral side. Such a configuration is also favourable in view of interconnection of several drive units.

The vehicle 10 exhibits at least one further first drive unit 11*b* exhibiting first and second circumferential tracks 12*a*, 12*b* and accommodating a plurality of further suspension elements 13*b* which are arranged mirror-inverted, with respect to the suspension elements 13 of the first drive unit 11*a*. The first and second drive units 11*a*, 11*b* provide for a traveling motion (e.g. by a synchronous guiding/driving motion of/to the suspension elements), and these drive units 11*a*, 11*b* can be interconnected, e.g. via cross-beams or the like. Also, the first and second drive units 11*a*, 11*b* may provide for different driving motions, e.g. in order to force a non-linear, but curved/curvilinear traveling motion. The desired/required traveling motion can be controlled via a control unit 30 coupled to at least one motor or actuator 17. In particular, the vehicle can be provided as a kind of passive vehicle which traveling motion is induced by external forces; in such a configuration, the inventive kinematics provide for hanging/suspending the vehicle, but not for actively driving the vehicle for any traveling motion. The drive section may also comprise at least one gear unit 18 configured for interacting with the track(s) and at least one energy storage unit 19. A sensor arrangement 40, e.g. comprising position sensors and velocity sensors and/or weight sensors and/or gyroscopes, may provide sensor data to the control unit.

Each suspension element 13 exhibits a first pulley 13.1 and a second pulley 13.2, and optionally, a wheel 13.3 is provided at the free end of the suspension element 13 (bearing point P13). The first and second pulleys are arranged on a lever arm 13.5 in distance from/to each other (y-offset, longitudinal extension y13 of lever arm); the bearing point P13 resp. the wheel 13.3 is arranged at a protruding section resp. suspension arm 13.6 (z-offset). At the free end of the suspension arm, optionally, a current collector resp. power-slider 13.4 (conductive slider for energy transfer) is provided in an arrangement geometrically corresponding to a/the power rail 1.3 of the respective profile 1.1. The plurality of suspension elements 13 of a/the respective drive unit 11 can be interconnected via longitudinal connecting elements 15 which can ensure a closed loop 15*a* of interrelated suspension elements. Thus, the suspension elements 13 are coupled to the respective circumferential tracks.

In other words: The suspension elements preferably exhibit a wheel 13.3 performing a rolling motion on the profile, allowing for motion which is orthogonal to the motion predefined and evoked by the tracks, wherein the wheel is positioned orthogonally with respect to the first and second pulleys. The wheel is motorised by means of further actuators or motors. The first pulley 13.1 is engaged with the first or second circumferential track, thereby following that track; also, the second pulley 13.2 is engaged with the first or second circumferential track, thereby following that track (which is different from the track engaged by the first pulley, i.e. vice versa). The lever arm 13.5 is preferably L-shaped, especially provided as integral element in one piece (massive, solid).

Preferably, the structure 1 and its raster 1*a* is defined by profiles 1.1 being arranged in parallel and with similar distance (pitch) to adjacent profiles. Each profile is preferably configured to support geometries/surface(s) which are adequate for interaction with the wheel(s) of the suspension elements (e.g. T-profile, C-profile, L-profile, l-profile), and a series of such profiles preferably provides for a planar surface at least in sections.

By means of the circumferential tracks and the suspension elements, the (respective) drive unit provides for de-/coupling kinematics 20 which ensure both vertical motion kinematics 20*a* and non-circular pivot motion kinematics 20*b*. Thereby, de-/coupling of each suspension element can be effected via circumferential motion along the tracks without the need of any axial telescopic motion within each suspension element. I.e., the suspension element can be designed as purely mechanic unit.

In particular in context with logistic tasks, the vehicle 10 may exhibit at least one hoist unit 50 providing for a traction mechanism 51 (especially with rope winch) and having at least one transmission means 53 (especially a rope).

In the following, the kinematics provided by the guiding/driving motion along the circumferential tracks is described in general, first:

The first pulley 13.1 of each suspension element 13 rotates about a first pulley axis X13.1 and defines a first guiding point G13.1 (coupling the first track and the respective suspension element), and vice versa, the corresponding point of the corresponding circumferential track defines that first guiding point G13.1 for each suspension element. Likewise, the second pulley 13.2 of each suspension element 13 rotates about a second pulley axis X13.2 (which is preferably aligned in parallel) and defines a second guiding point G13.2 (coupling the second track and the respective suspension element). When referring to the kinematics of each suspension element, an instantaneous centre of rotation Or of each suspension element is defined by the axis X13.1 of the first pulley 13.1 being coupled to the first track 12*a*, wherein coupling/attachment/fixation can be ensured e.g. at the axial section between a/the suspension arm 13.6 and the first pulley 13.1 (cf. FIG. 3B). The two tracks 12*a*, 12*b* are arranged with respect to another in such a manner that the contacting/bearing point/area P13 of the respective suspension element 13 can be hooked or hitched on the ceiling structure. The wheel 13.3 of each suspension element rotates about a wheel axis Y13.3 which is preferably aligned orthogonally to the first and second pulley axis X13.1, X13.2. Since each suspension element 13 is coupled to the tracks 12*a*, 12*b* in predefined positions, namely in a predefined first longitudinal position y12*a* via the first pulley 13.1 and in a predefined second longitudinal position y12*b* via the second pulley 13.2, when driving the tracks resp. when guiding the suspension elements along the tracks, the bearing point P13 at the free end of the suspension element 13 is guided according to the relative position/contour and distance of the tracks.

In the figures, (x) designates a/the first spatial direction (especially cross direction, especially direction of longitudinal extension of T-profiles), and (y) designates a/the second spatial direction (especially longitudinal direction or momentary driving direction of the drive units), and (z) designates a/the third spatial direction (especially vertical direction).

Figure 1C:
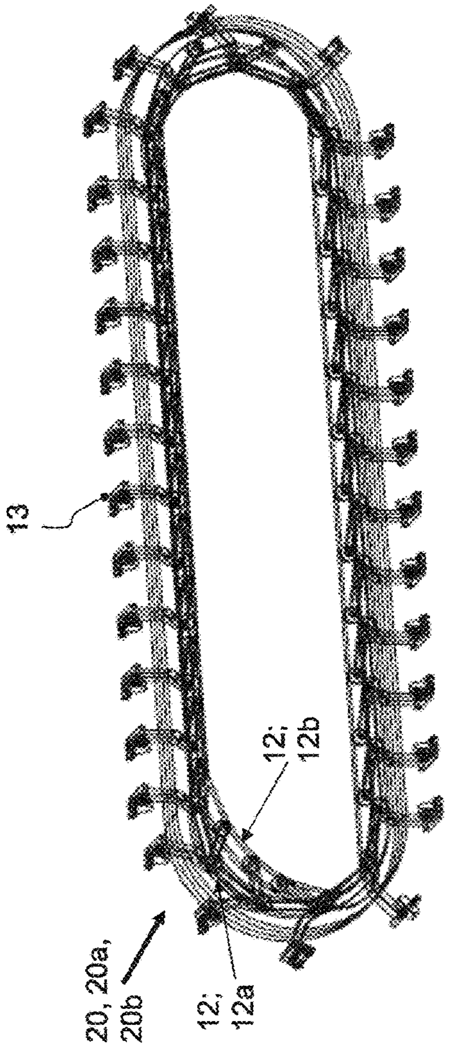
Figure 1B:
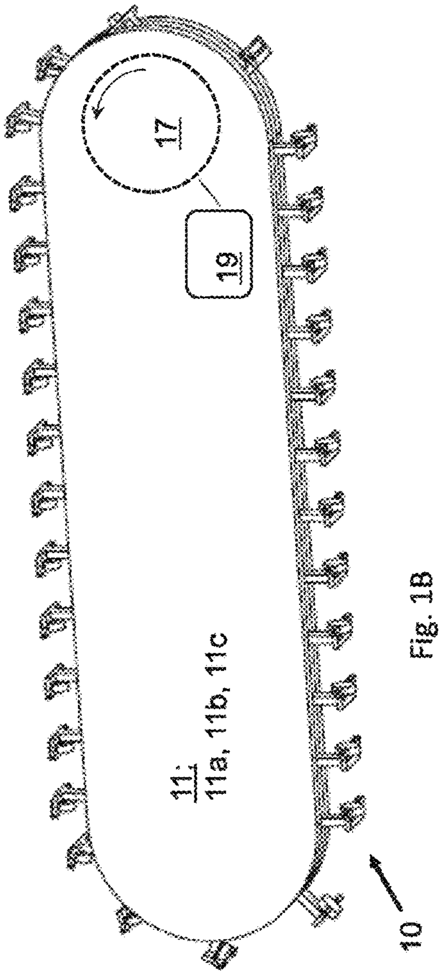
Figure 1D:
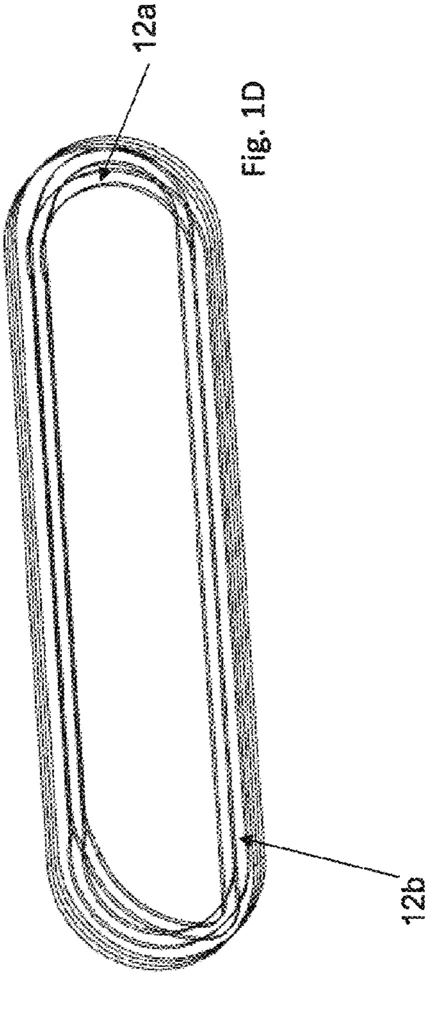
Figure 1E:
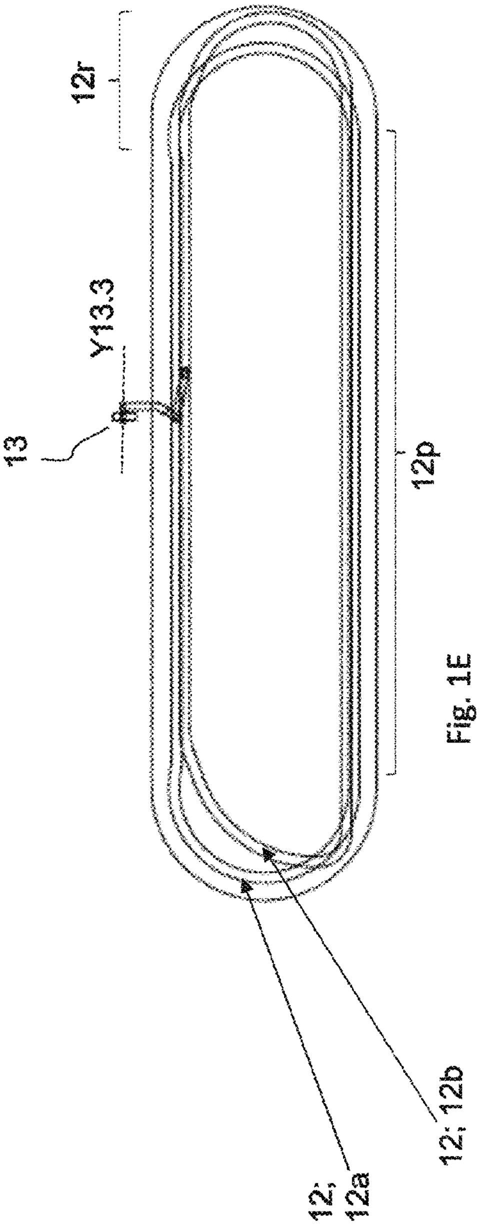

FIG. 1A shows a (ceiling) vehicle 10 exhibiting a first drive unit 11 and suspension elements 13, wherein a subset of the suspension elements 13 is momentarily coupled to a/the ceiling structure 1, namely to T-profiles. The suspension elements 13 are guided and also actively driven along two circumferential tracks (not shown, cf. FIG. 1C), and de-/coupling is carried out in curved sections of the tracks.

The vehicle 10 shown in FIG. 1A is suspended/hanging at a ceiling structure.

Nonetheless, the vehicle 10 may also be suspended in a similar structure being arranged on the ground or at the wall. The vehicle is not necessarily provided in the form of a ceiling vehicle; rather, FIG. 1A illustrated an application/use at a ceiling structure.

FIG. 1B, 1C, 1D, 1E show separate components of the respective first drive unit 11, 11*a*, 11*b*, 11*c*. At least one drive 17 provides for circumferential motion of the tracks 12*a*, 12*b*, especially by means of at least one gear unit 18 engaging the tracks. It is shown that the de-/coupling kinematics are provided within the curved sections 12*r* of the first and second circumferential tracks 12*a*, 12*b*. In contrast, within the parallel section(s) 12*p*, the suspension elements 13 remain in predefined relative positions at/with respect to the ceiling structure. In that section, the axis Y13.3 of the wheel 13.3 of the respective suspension element 13 is aligned parallel to the parallel section(s) 12*p* of the tracks.

Figure 4A:
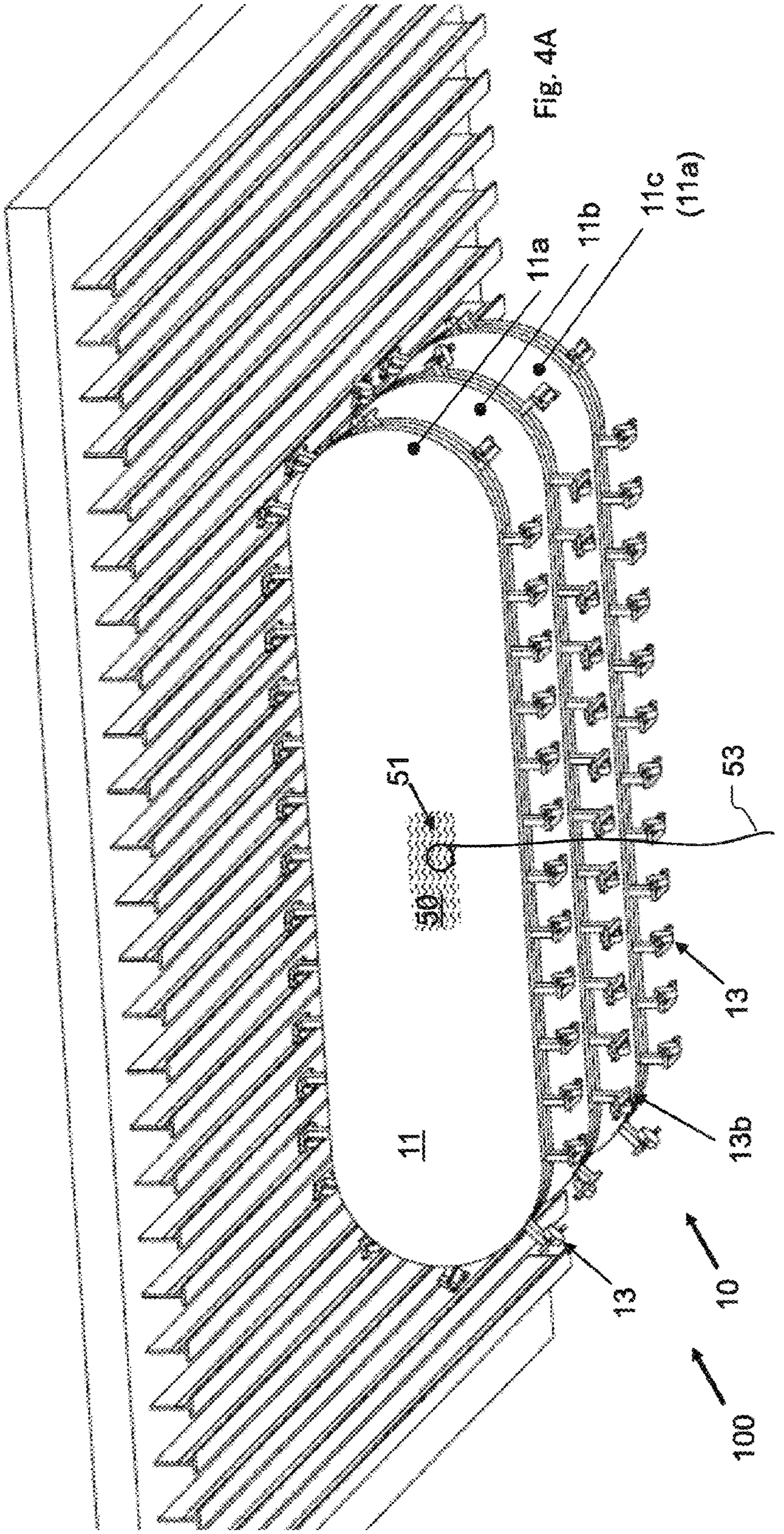
FIGS. 4A, 4B, 4C, 4D, 4E, 4F, 4G show in perspective views and in side views components (first drive units) of a ceiling vehicle.
Figure 4B:
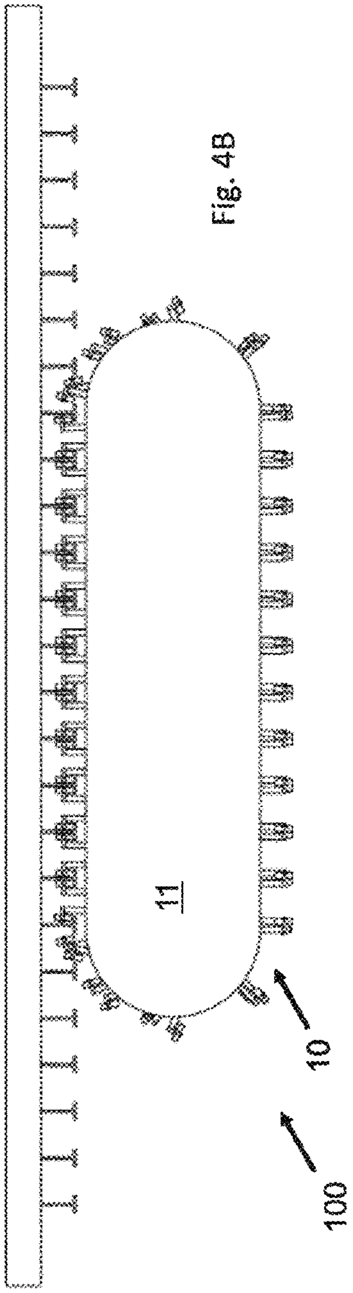
Figure 4C:
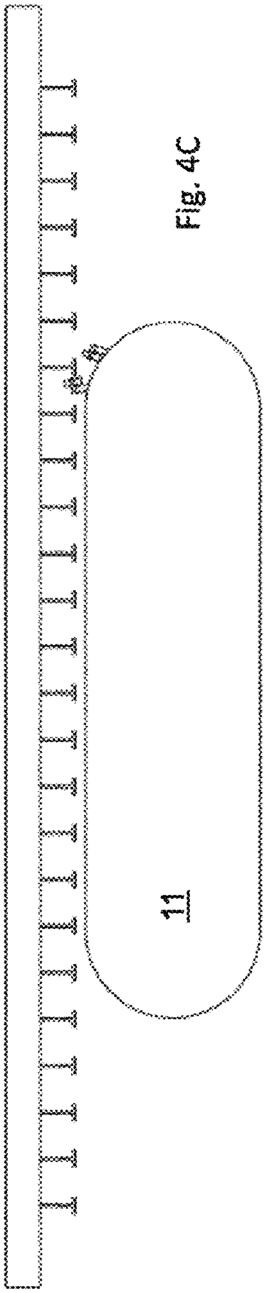
Figure 4D:
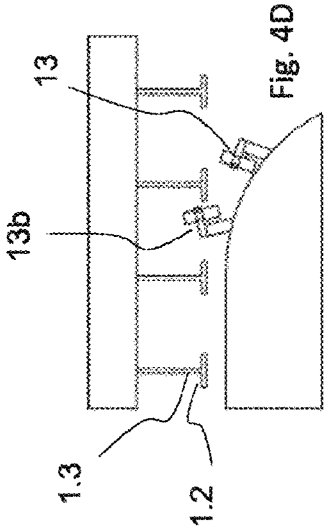

In case the vehicle exhibits several first drive units 11*a*, 11*b*, some of these components may also be arranged in a mirror-inverted manner, especially the suspension elements (cf. FIG. 4A). Thus, any detailed description of the figures relating to any separate/single component of the respective drive unit may also describe a similar configuration of any further drive units or any further redundant components.

Figure 1F:
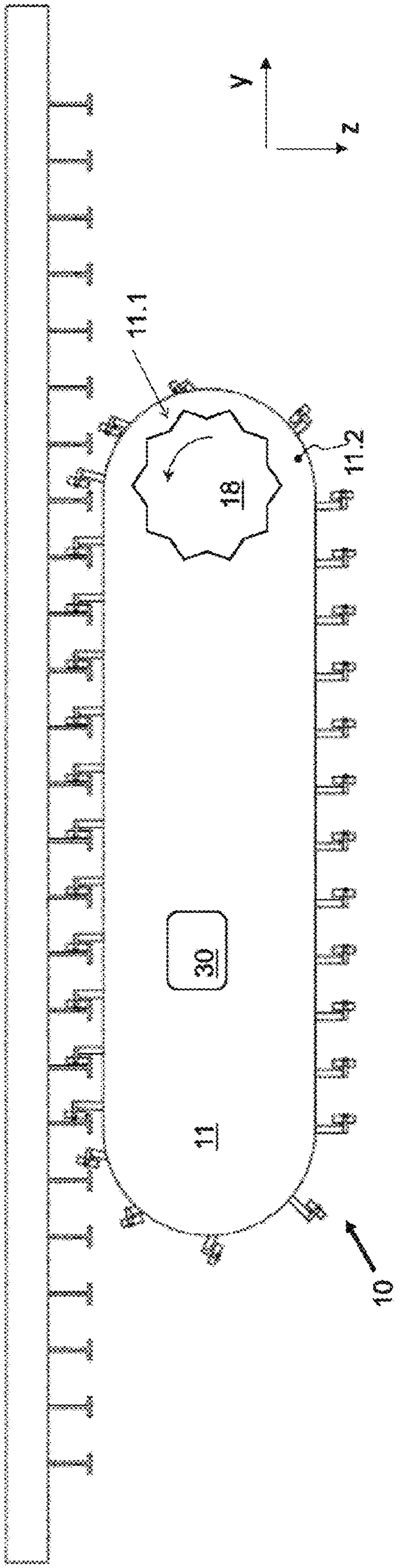
Figure 1G:
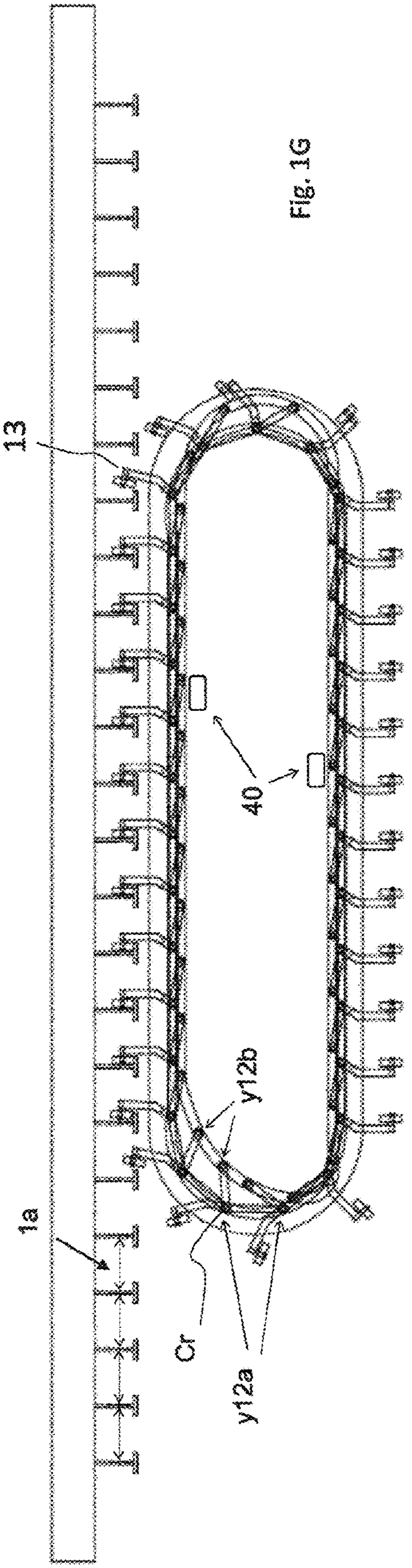
Figures 1H, 1J, 1K, 1L, 1M, 1N, 1O:
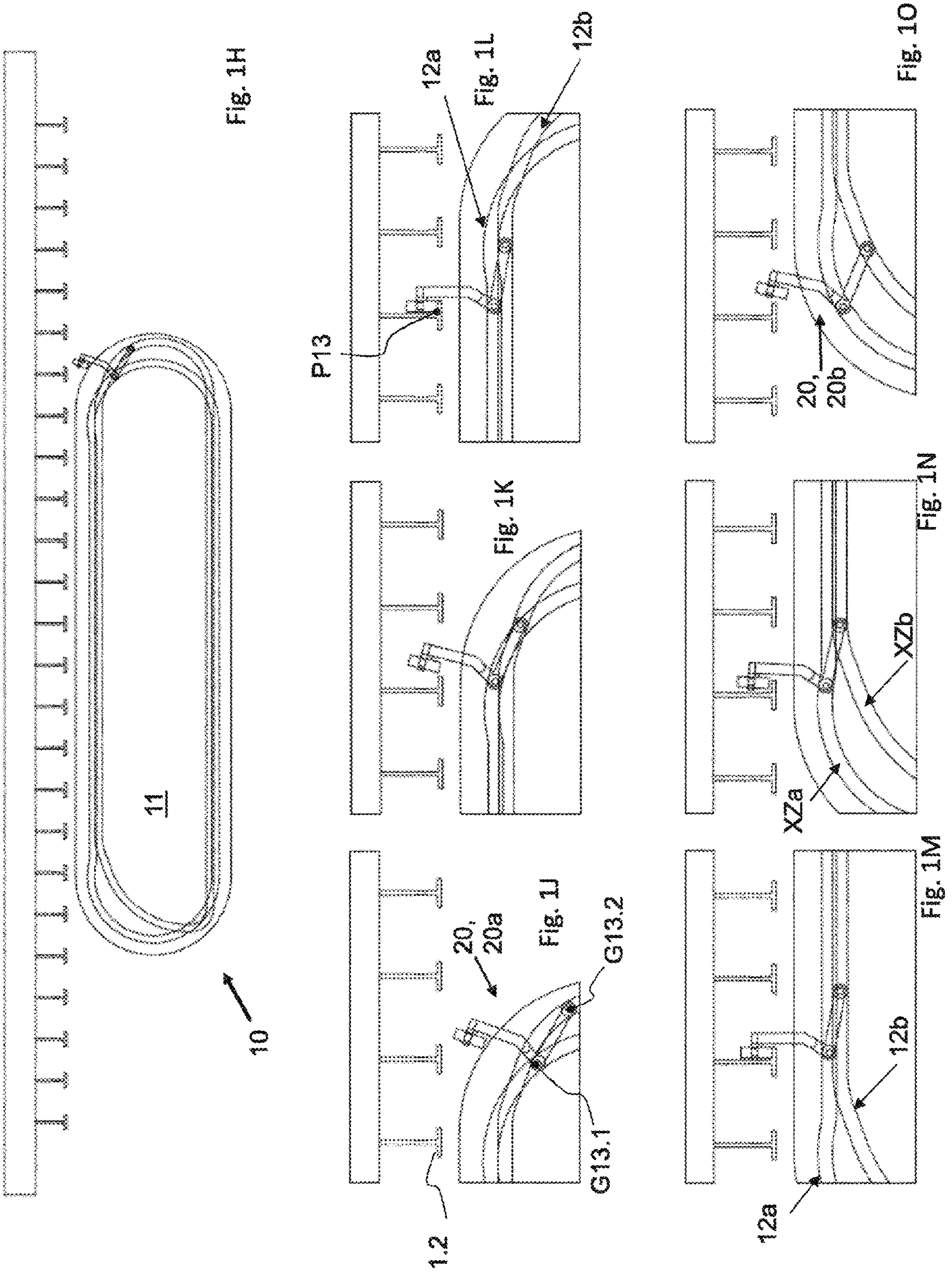

FIG. 1F, 1G illustrate the curved sections 12*r* in more detail. It can be seen that both the radius of curvature and the distance of the tracks with respect to each other deviates/changes in value and direction, thereby effecting a pivot motion of the suspension arm 13.6 (protruding section) and the wheel 13.3 resp. bearing point P13 of the respective suspension element 13 (especially pivoting within the plane yz as shown in FIG. 1F and pivoting about an x-axis and around the instantaneous centre of rotation Cr). Thus, both vertical motion kinematics 20*a* and non-circular pivot motion kinematics 20*b* can be provided by means of rigid/stiff components being guided/driven along two circumferential tracks with different shape/contour.

FIG. 1H, 1J, 1K, 1L, 1M, 1N, 1O show some more details of the de-/coupling kinematics 20. In particular, it can be seen that the first track 12*a* has a curvature bent up (upwards), thereby effecting a slight lifting of the wheel 13.3 from the wheel tread 1.2, namely when the first pulley 13.1 is passing that section. In particular, apart from one single section, the shape/contour XZb of the second circumferential track 12*b* runs (is arranged) within the shape/contour XZa of the first circumferential track 12*a*.

Figure 2B:
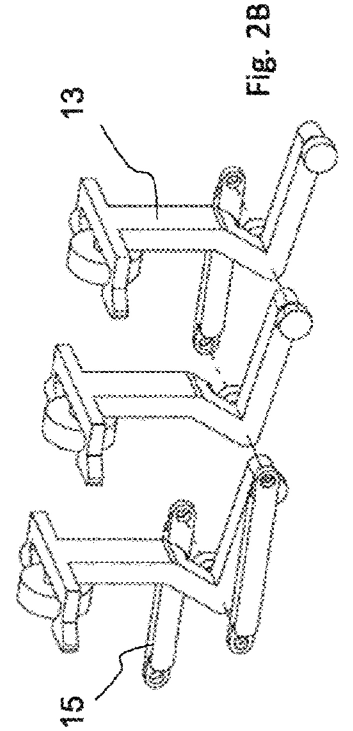
FIGS. 2A, 2B, 2C show in perspective views an arrangement of suspension elements and respective arrangement along a circumferential track of a ceiling vehicle.
Figure 2A:
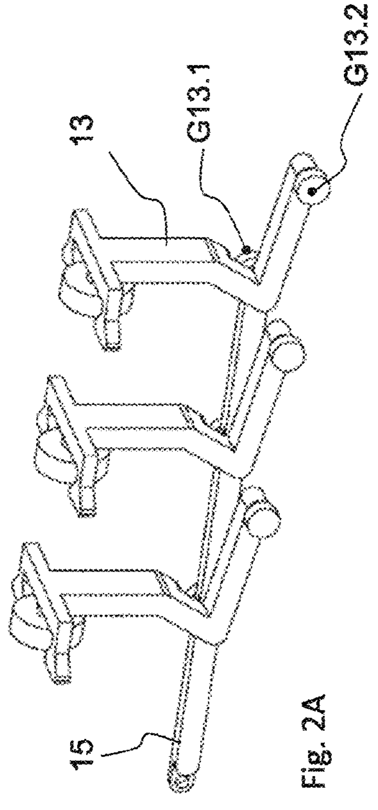
Figure 2C:
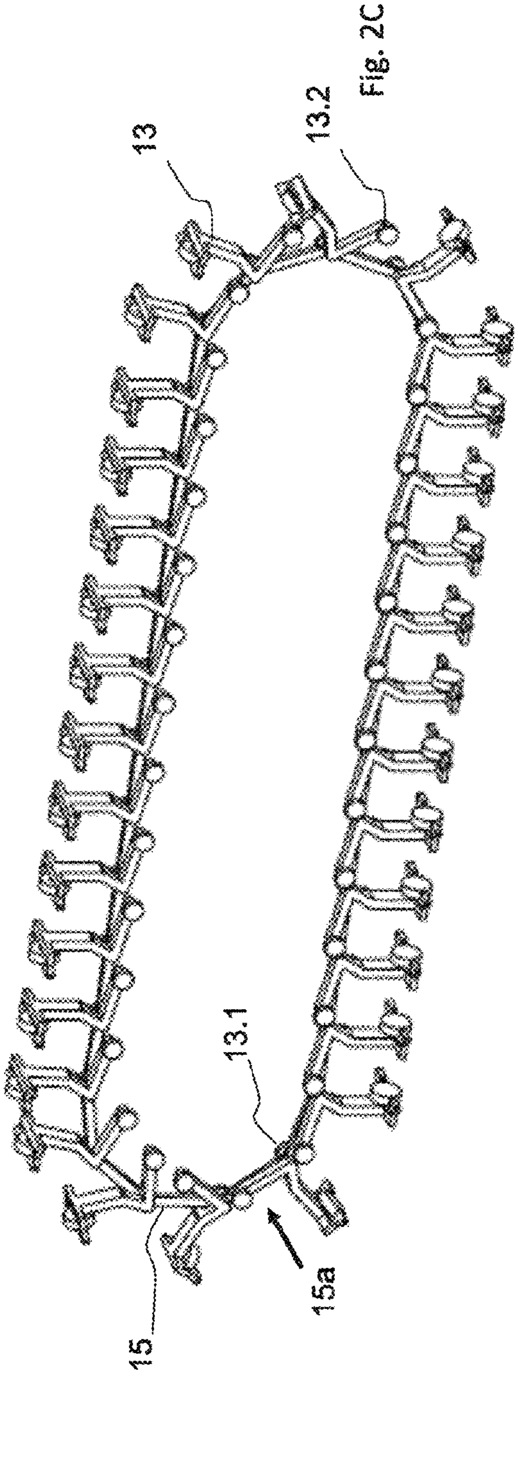

FIG. 2A, 2B, 2C show a plurality of suspension elements 13 being interconnected via longitudinal connecting elements 15 which thereby ensure a closed loop 15*a* of interrelated suspension elements. The suspension elements 13 are coupled to the respective circumferential tracks 12*a*, 12*b* via the first and second pulleys 13.1, 13.2.

In the embodiment shown in FIG. 2, the first and second pulleys 13.1, 13.2 are arranged on opposite lateral sides of the respective suspension element 13. Thus, the closed loop 15*a* of interrelated suspension elements is arranged between the first and second tracks 12*a*, 12*b* which extend on both lateral sides of the closed loop 15*a*.

The tracks 12*a*, 12*b* can be made of any kind of rail guide system components, in particular including at least one chain, belt, cable or the like traction or transmission means. The tracks 12*a*, 12*b* may comprise different guide/rail sections coupled together, each exhibiting a different radius of curvature or being linear. Also, the tracks 12*a*, 12*b* can be formed/made by on single continuous/coherent rail.

Figures 3A, 3B, 3C:
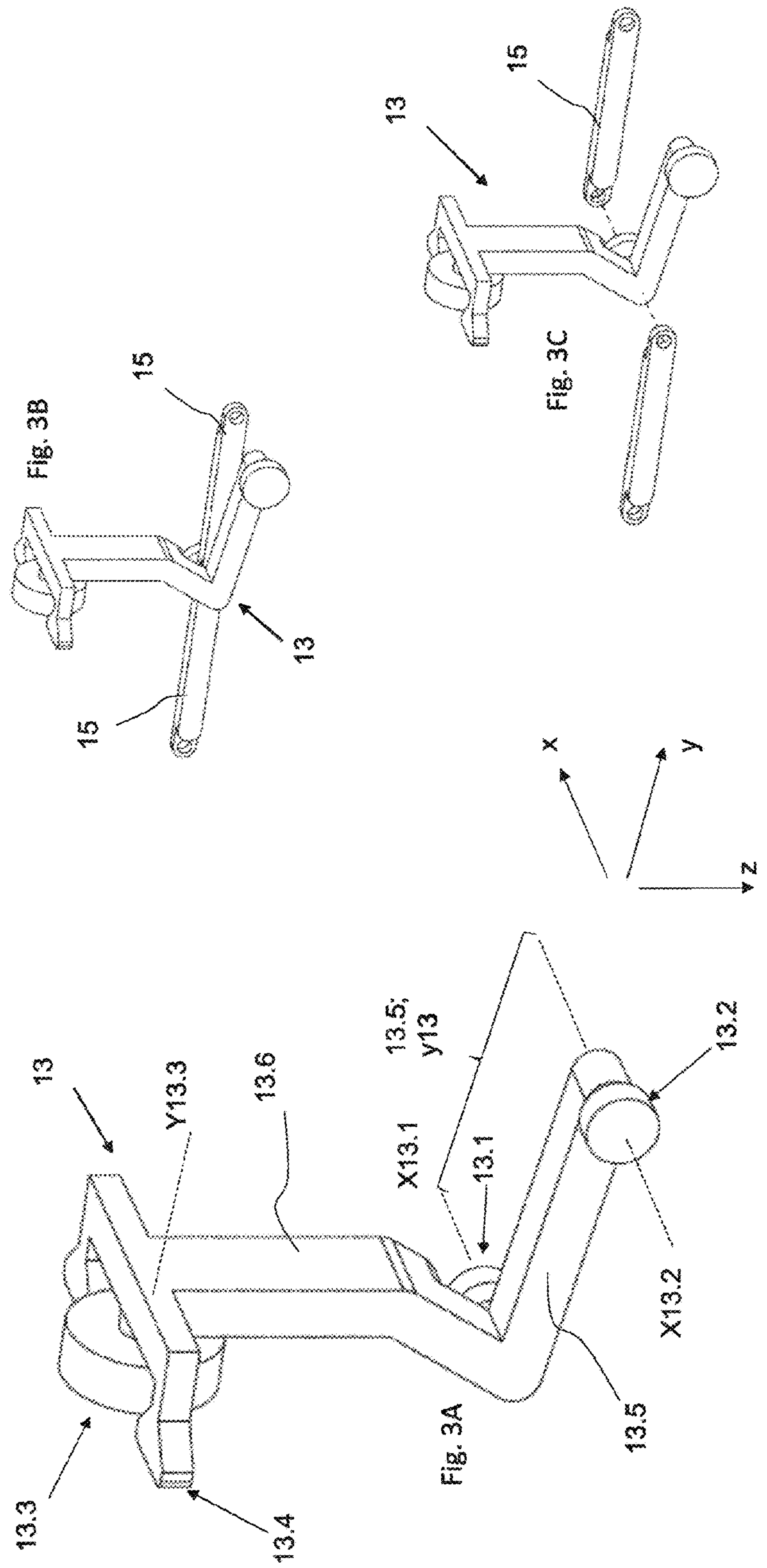
FIGS. 3A, 3B, 3C show in perspective views details of suspension elements of a ceiling vehicle.

FIG. 3A, 3B, 3C show some more details of the suspension elements 13 and the connecting elements 15. E.g., the connecting elements 15 are coupled to the lever arm 13.5 at the axis X13.1 if the first pulley 13.1, thereby facilitating pivot motion about that axis (resp. around the respective instantaneous centre of rotation Cr).

Figure 4E:
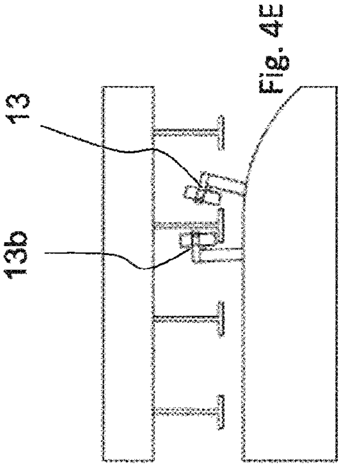
Figure 4F:
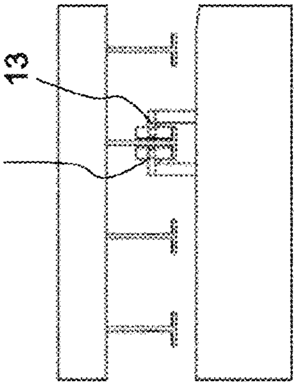
Figure 4G:
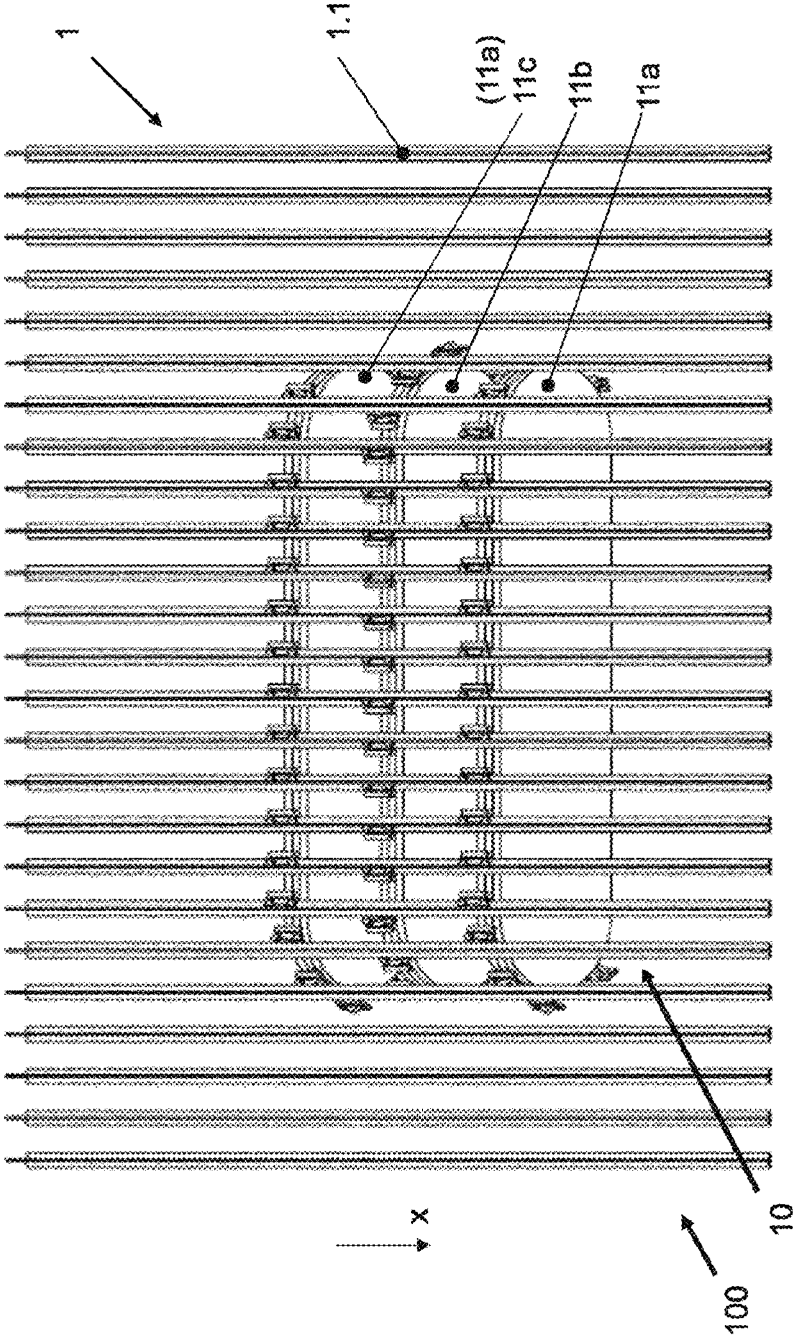
Figure 5B:
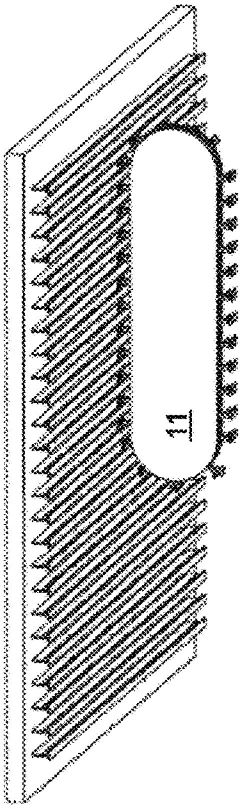
FIGS. 5A, 5B, 5C, 5D illustrate in different perspective views an exemplary path of a motion of a ceiling vehicle.
Figure 5D:
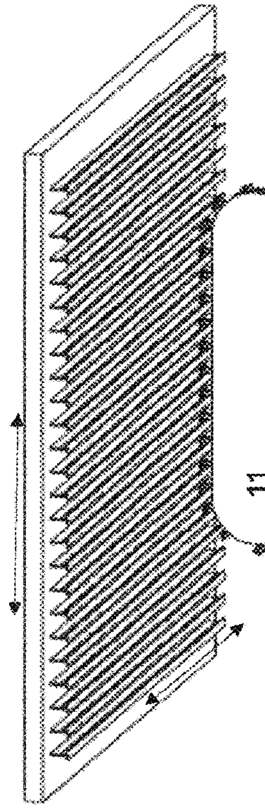
Figure 5A:
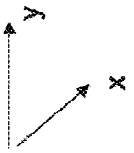
Figure 5A:
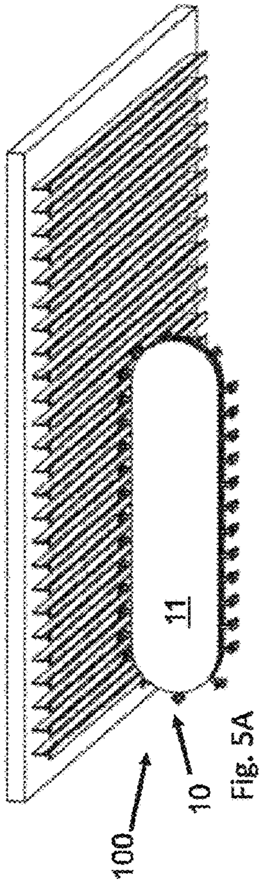
Figure 5C:
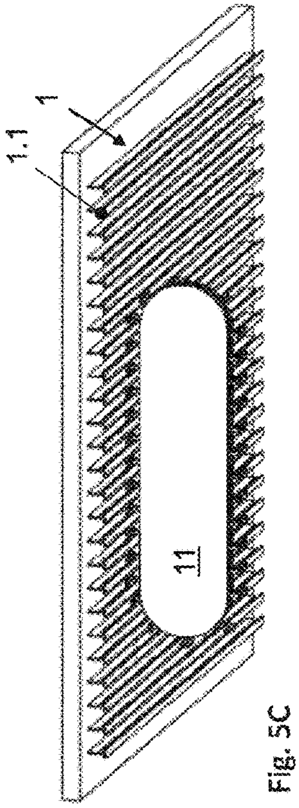

FIG. 4A, 4B, 4C, 4D, 4E, 4F, 4G show an embodiment of a vehicle 10 exhibiting three first drive units 11*a*, 11*b*, 11*c* which can be interrelated/connected e.g. via cross-beams or the like. In contrast to the configuration at the first drive unit 11*a*, the suspension elements 13*b* of the further first drive unit 11*b* are arranged in mirror-inverted manner, but the suspension elements 13 of the further first drive unit 11*c* are arranged in the same manner as the suspension elements 13 of the first drive unit 11*a*. As can be seen in FIG. 4E, 4F, that configuration allows for a very good security and stability level (both types of suspension elements 13, 13*b* are guided along the T-profiles, but on different lateral sides of the T-profiles). Alternatively, the vehicle 10 may only comprise two first drive units 11*a*, 11*b*.

FIG. 5A, 5B, 5C, 5D show different kinds of traveling motions which can be effected by means of the vehicle 10 described herein. As already described further above, the present invention allows for two-dimensional traveling motion both in a first spatial direction (x) corresponding to the longitudinal direction/extension of the T-profiles 1.1 (dashed line arrow), and in a second spatial direction (y) corresponding to the driving direction resp. to the direction/extension of the tracks (dotted line arrow).

It should be mentioned that the T-profiles shown in the figures may also be provided as other kinds of profile rails; i.e., the inventive mechanism/kinematics is/are not limited to use of T-profiles only; rather, the skilled person is aware of the fact that also other profiles offering adequate suspension for the suspension elements and optionally also a guiding track to the wheels can be used.

In the following, further aspects/details of embodiments of the present invention are described in more detail. For any reference signs or elements/components or aspects not explicitly mentioned/described, it is referred to above mentioned embodiments, respectively. The embodiments described in the following passages exhibit a first drive unit comprising a chain drive, and the first circumferential track comprises a chain (with a closed loop of interrelated chain elements arranging the corresponding suspension elements and optionally also arranging counter bearing elements), and the longitudinal connecting elements of that first drive unit are provided in the form of chain elements.

Figure 6B:
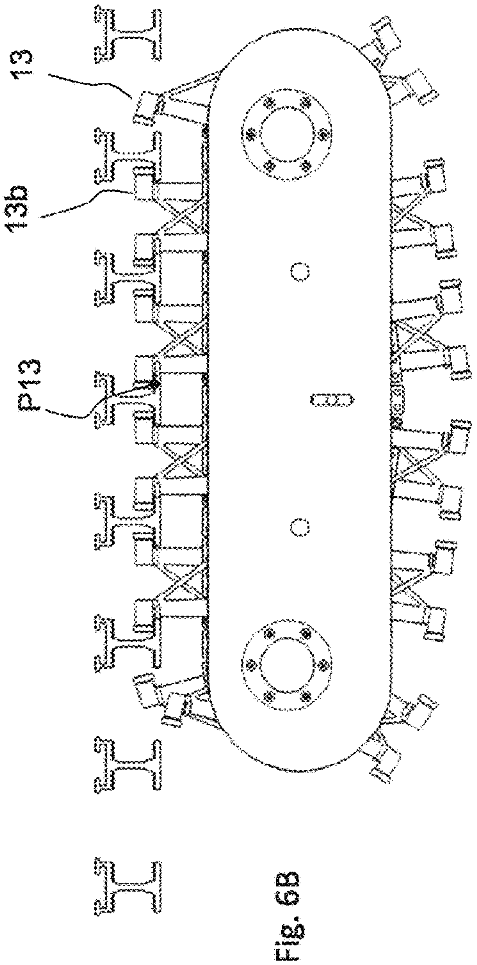
FIGS. 6A, 6B show, in side views, components of a ceiling vehicle (full suspension, and suspension with respect to vertical forces of inertia and lateral forces)
Figure 6A:
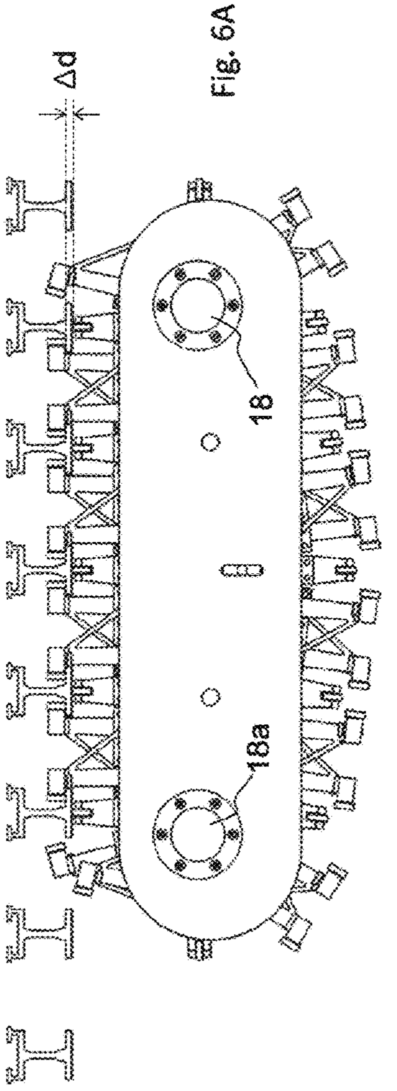

FIG. 6A shows a vehicle exhibiting means for avoiding any relative motion of the vehicle with respect to the structure (full suspension especially also in view of any relative motion orthogonally/normally with respect to the structure), and FIG. 6B shows a configuration which at least ensures secure suspension in view of vertical forces of inertia and lateral forces (suspension devoid of counter bearings).

Figure 7B:
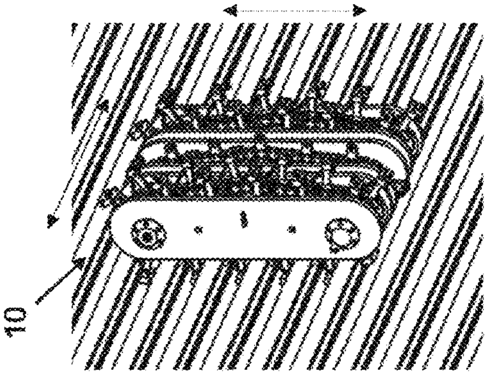
FIGS. 7A, 7B, 7C, 7D illustrate in different perspective views exemplary paths of motion (orientations of operation) of a ceiling vehicle.
Figure 7A:
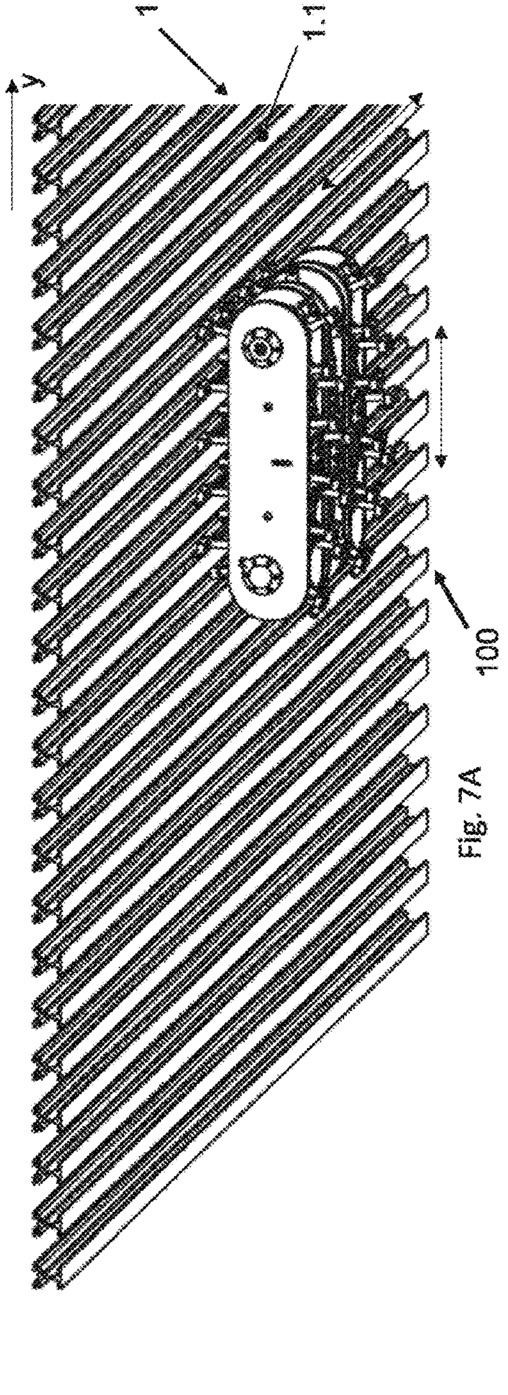
Figure 7D:
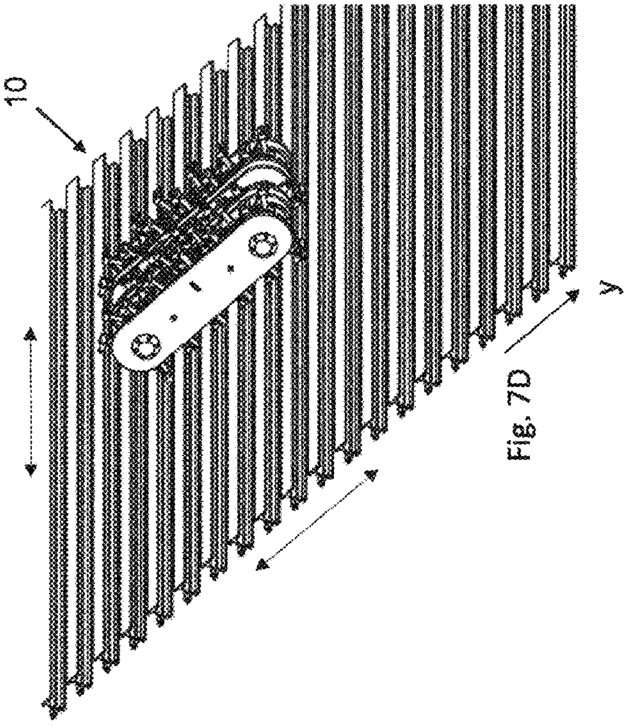
Figure 7C:
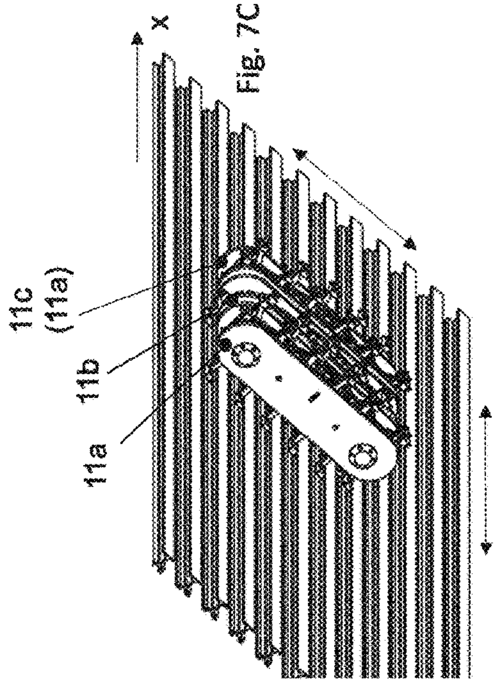

FIGS. 7A, 7B, 7C, 7D illustrate a ceiling vehicle arrangement 100 comprising a ceiling vehicle 10 exhibiting three drive units 11*a*, 11*b*, 11*c*. As already described further above, the present invention allows for two-dimensional traveling motion both in a first spatial direction corresponding to the longitudinal direction/extension of the T-profiles 1.1 (dashed line arrow), and in a second spatial direction corresponding to the driving direction resp. to the direction/extension of the tracks (dotted line arrow). Depending on the orientation of the structure/T-profiles 1.1, the first and/or second spatial direction may also comprise a vertical (z-) component, as illustrated in FIG. 7C, 7D (inclined plane/level).

Therein, coordinates x, y shown in the figures in context with inclined planes refer to the longitudinal extension (x) of the (ceiling) structure.

The vehicle 10 shown in FIG. 7A is suspended/hanging at a ceiling structure. Nonetheless, the vehicle 10 may also be suspended in a similar structure being arranged on the ground or at the wall. The vehicle is not necessarily provided in the form of a ceiling vehicle; rather, FIG. 7A illustrated an application/use at a ceiling structure. Same applies for any further figure of the present disclosure illustrating an application/use at a ceiling structure only as an example.

Figure 8B:
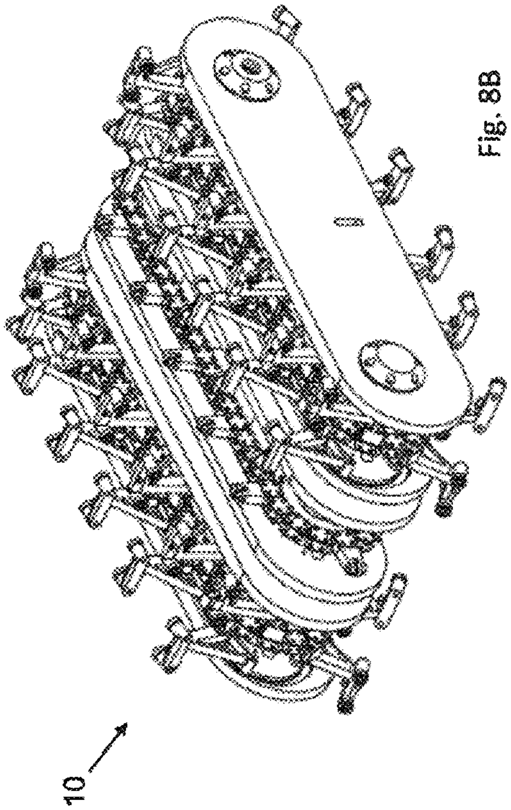
FIGS. 8A, 8B, 9A, 9B show in perspective views ceiling vehicles with and without counter bearing.
Figure 8A:
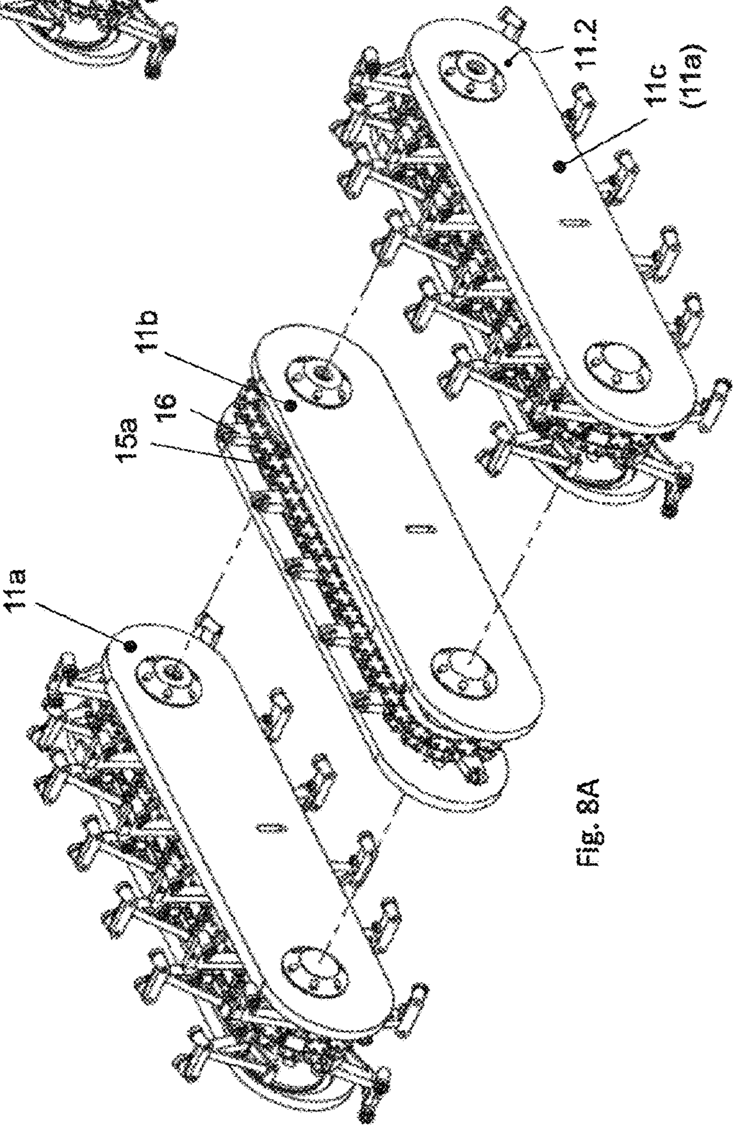
Figure 9B:
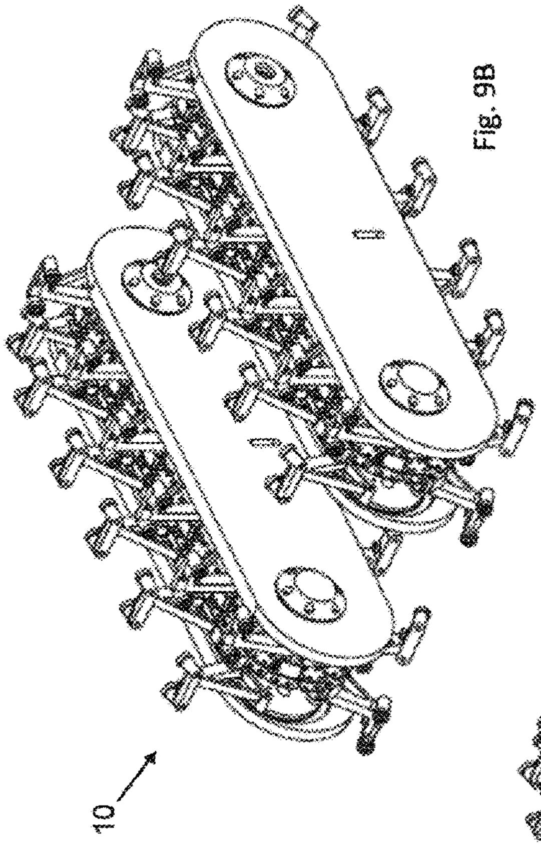
Figure 9A:
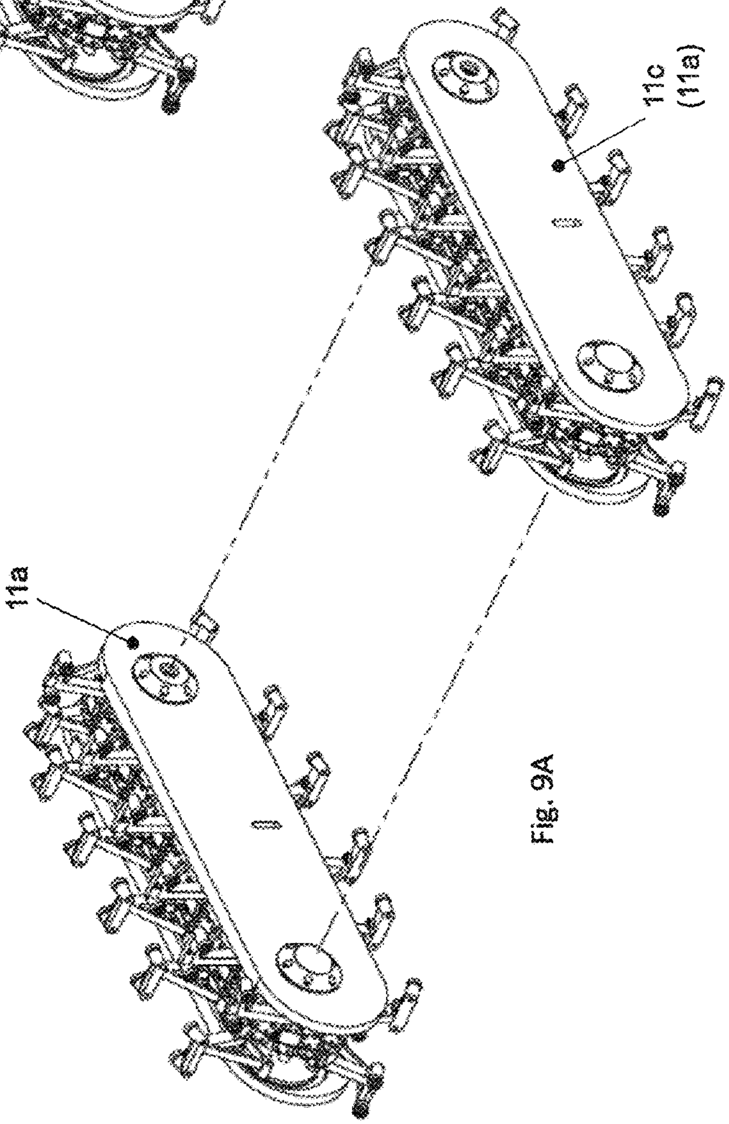

FIGS. 8A, 8B show some more details of a ceiling vehicle 10 exhibiting three first drive units 11*a*, 11*b*, 11*c* arranged laterally with respect to each other, wherein one of the further first drive units 11*b* arranged there between (in the middle) does not exhibit any suspension elements but counter bearings 16, and FIGS. 9A, 9B show some more details of a ceiling vehicle 10 exhibiting two first drive units 11*a*, 11*c* (each without counter bearing). In the embodiment shown in FIG. 8, the further first drive unit 11*b* provides for counter bearings 16 which are coupled to the chain 15*a*, i.e., the first circumferential track provides for positioning and motion of the counter bearings 16. It should be noted that in the embodiment shown in the figures, these counter bearings 16 are intended for interfering with the structure only at a face side, and therefore, no decoupling kinematics are provided in context with these counter bearings 16. Therefore, there is no need for provision of any further second circumferential track at/for the further first drive unit 11*b* arranged in the middle. Thus, in this embodiment, the further first drive unit 11*b* arranged in the middle and accommodating (only) the counter bearings only exhibits a/the first circumferential track.

Figure 10B:
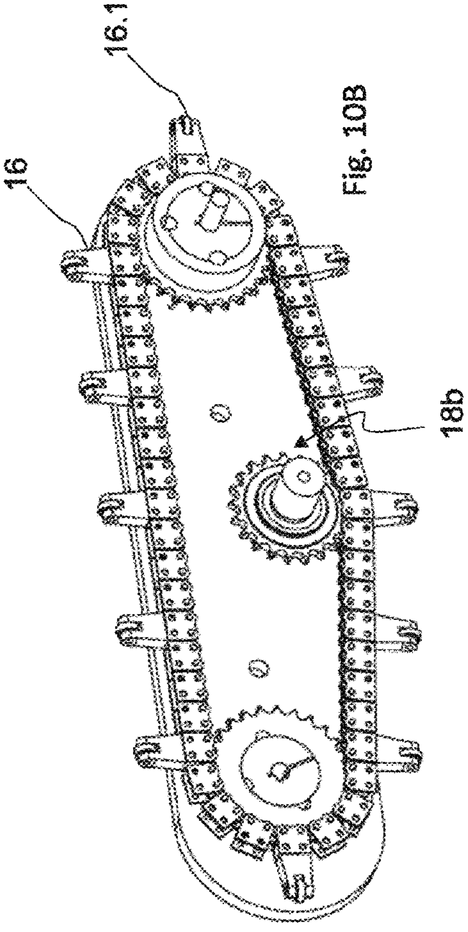
FIGS. 10A, 10B show in perspective views a ceiling vehicle.
Figure 10A:
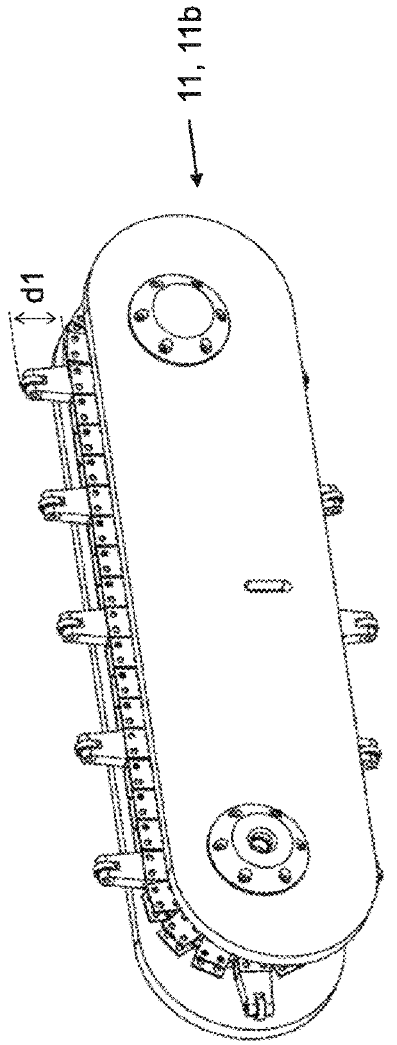

FIGS. 10A, 10B show some details of a first drive unit 11, 11*b* only accommodating counter bearings but no suspension elements.

Figure 13:
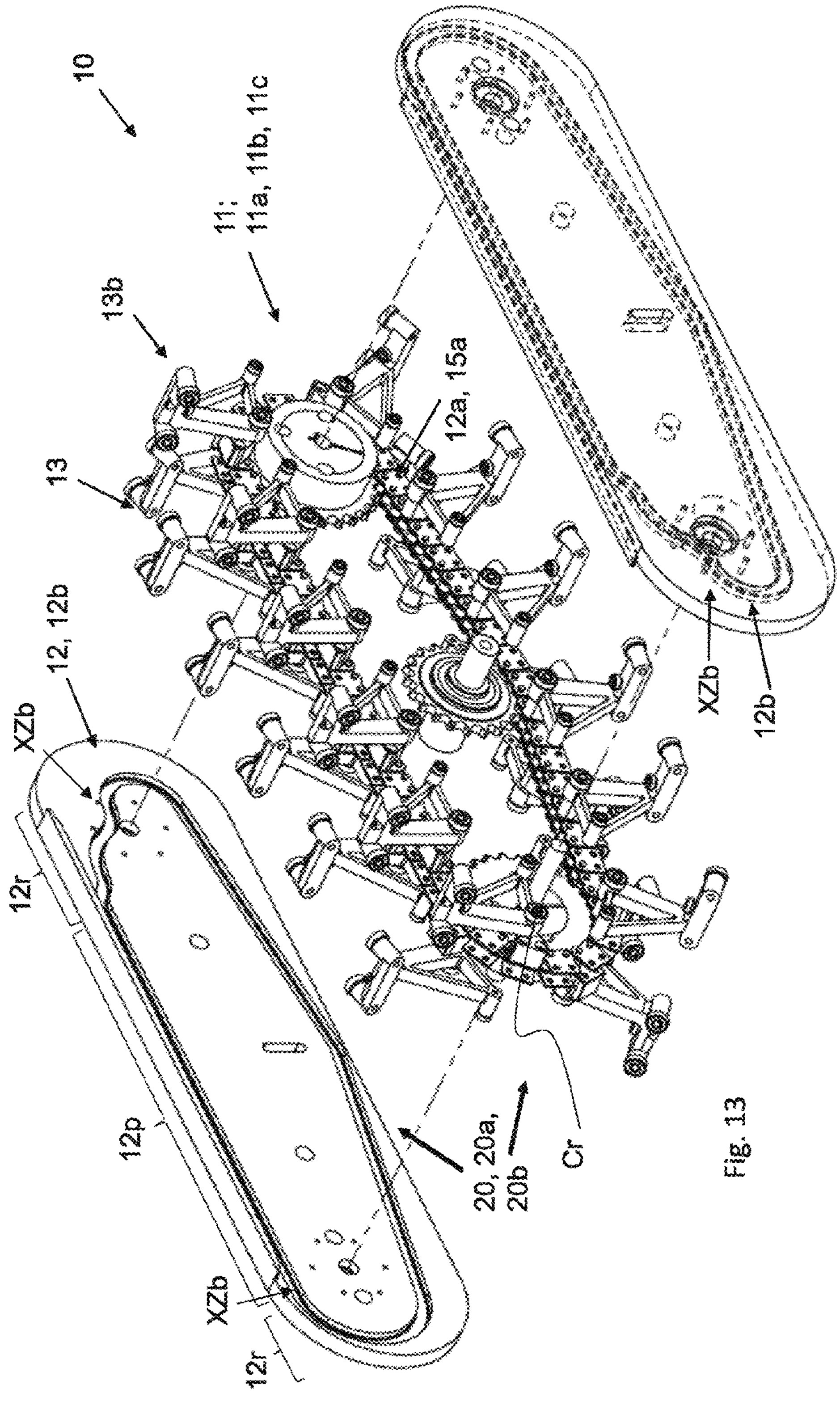
FIG. 13 shows in a perspective view details of a ceiling vehicle shown in FIG. 10.
Figure 14B:
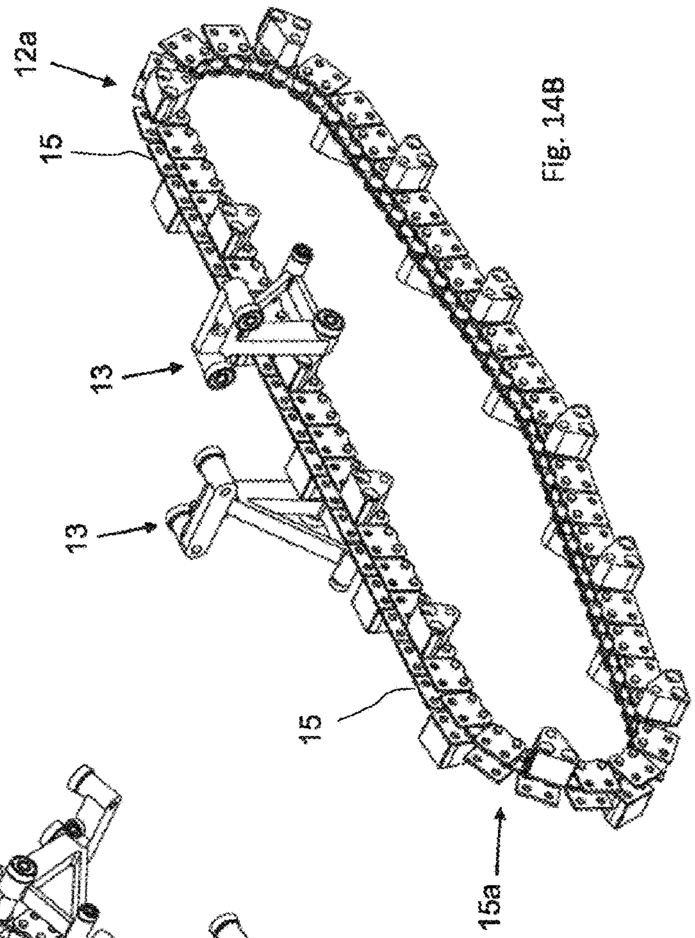
Figure 14A:
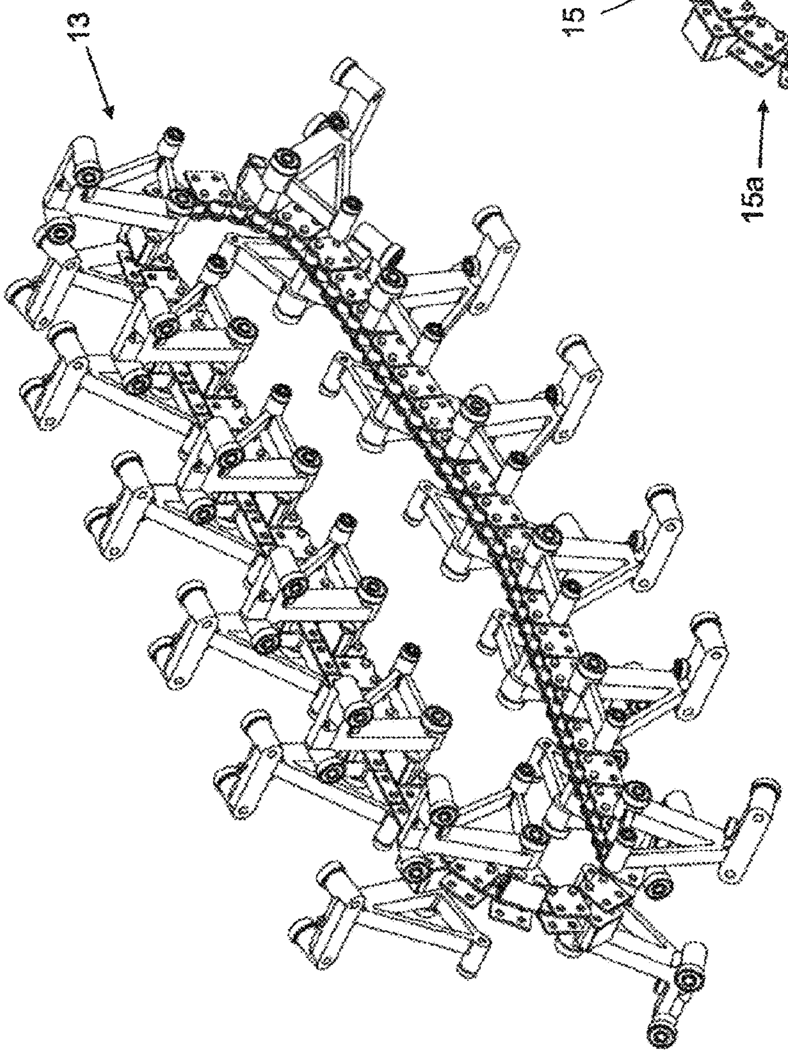

FIGS. 11A, 11B, 11C and FIGS. 12A, 12B and FIG. 13 and FIGS. 14A, 14B show some kinematic aspects of first drive units accommodating/arranging/guiding both suspension elements 13 and further suspension elements 13*b*. FIG. 13 also illustrates that one (each) first drive unit 11 may comprise the first circumferential track (here: provided/defined by the chain 15*a*) and two second circumferential tracks 12*b*, wherein these two second circumferential tracks 12*b* are arranged asymmetrically, i.e., the shape/contour XZb is asymmetrical. Such an arrangement also allows for providing de-/coupling kinematics for both a plurality of suspension elements 13 and a plurality of further suspension elements 13*b*, especially in such a manner that both types of suspension elements 13, 13*b* may interact and engage in the same (but asymmetrical) manner with the structure 1, especially at the same profile rail at opposite lateral sides, respectively. Such an arrangement may also ensure a high security and stability level already by means of one single first drive unit 11. Thus, scaling (two, three or even more) of the first drive units is realizable in even more flexible manner, and individual arrangements can be optimized for each application.

It should be noted that the first circumferential track resp. a/the chain may/can provide for guiding and driving both the suspension elements 13 and the further suspension elements 13*b*; both types of suspension elements 13, 13*b* can be coupled, e.g., via a protruding axial section (guiding bolt or shaft) 13.7 to the chain structure (cf. FIG. 16B) which protrudes vis-a-vis of the first pulley 13.1, especially along its axis X13.1. In particular, the suspension elements 13 and the further suspension elements 13*b* are arranged with longitudinal offset (y) and mirror-inverted on both sides of the chain 15*a*. In particular, the longitudinal distance (y) of the respective suspension element 13 and the respective further suspension element 13*b* of a respective pair of suspension elements 13, 13*b* corresponds to the extension in cross direction (y) of each element/profile of the (ceiling) structure.

Figure 15:
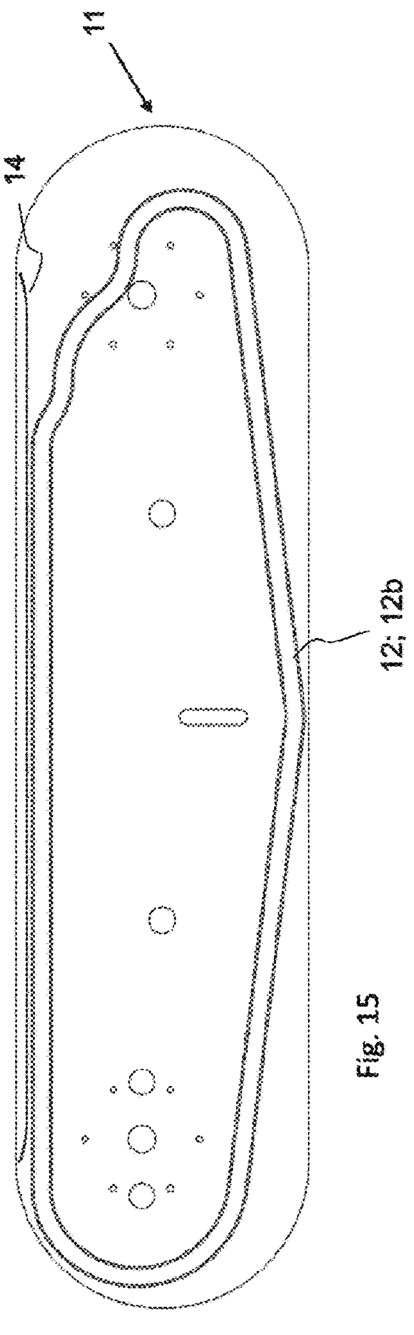
FIG. 15 shows in a side view components of a first drive unit of a ceiling vehicle shown in FIG. 10.

FIG. 15 also shows a guiding plank or rail 14 allowing for guiding the first circumferential track resp. the chain more precisely.

Figure 16B:
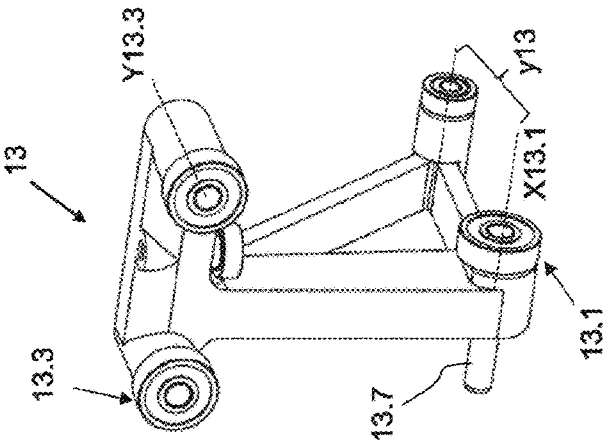
FIGS. 16A, 16B show in perspective views some of the details of suspension elements of a ceiling vehicle shown in FIG. 10.
Figure 16A:
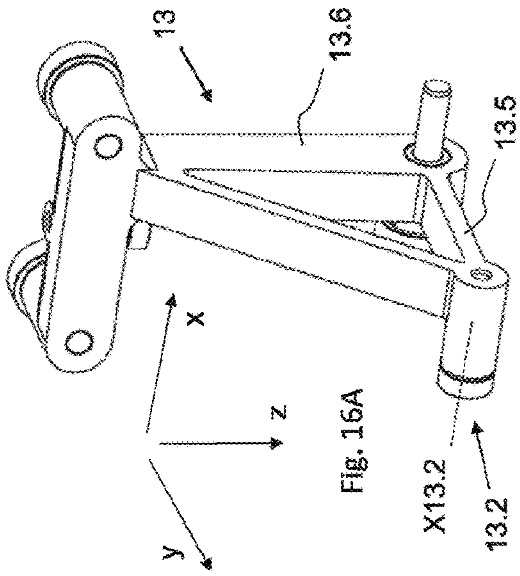

FIGS. 16A, 16B show a further embodiment of suspension elements 13, wherein in comparison with the suspension elements described above in context with FIG. 3, these suspension elements exhibit two wheels or pulleys 13.3 arranged and configured for interacting with the structure 1, and these suspension elements may also exhibit a further pulley which is suspended around an axis extending in the z-direction (as shown in FIG. 16B). That optional further pulley may ensure further/improved support and guiding with respect to the structure.

Figure 11C:
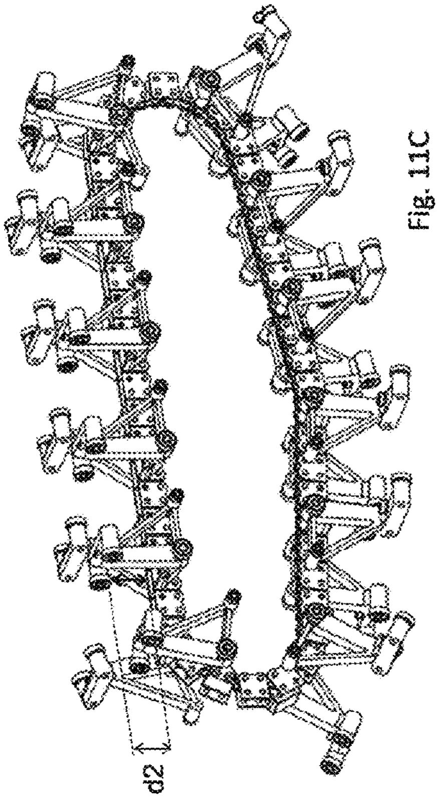
FIGS. 11A, 11B, 11C, 14A, 14B show in perspective views details of suspension elements (and their suspension) of a ceiling vehicle shown in FIG. 10.
Figure 11A:
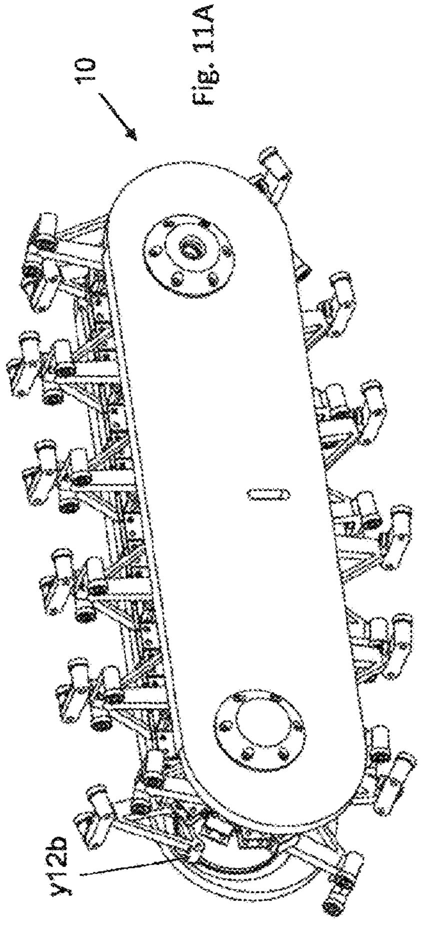
Figure 11B:
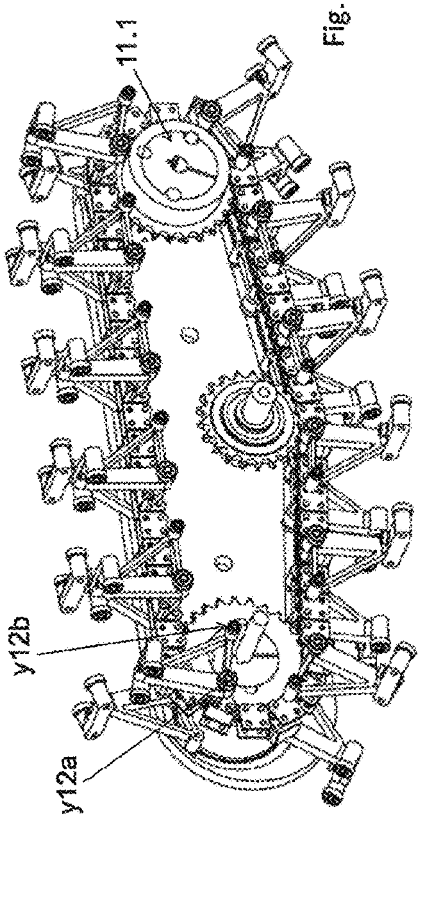
Figure 12B:
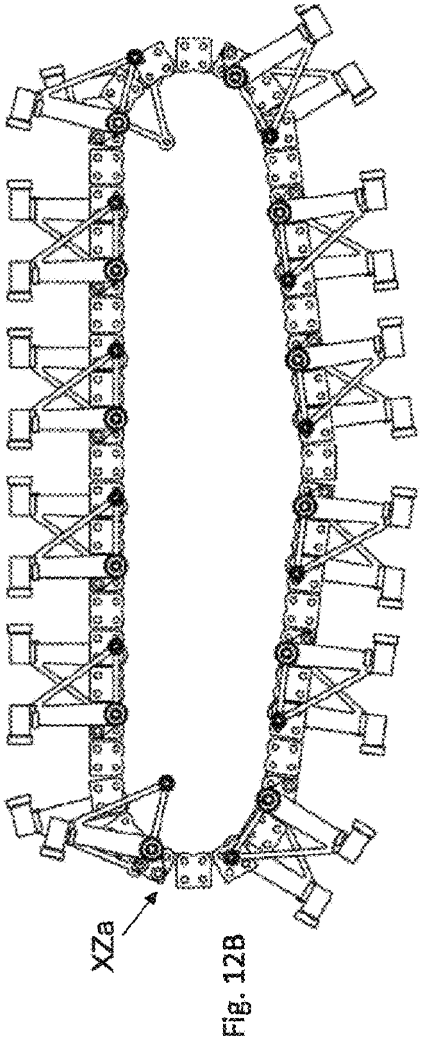
FIGS. 12A, 12B show in side views details of suspension elements of a ceiling vehicle shown in FIG. 10.
Figure 12A:
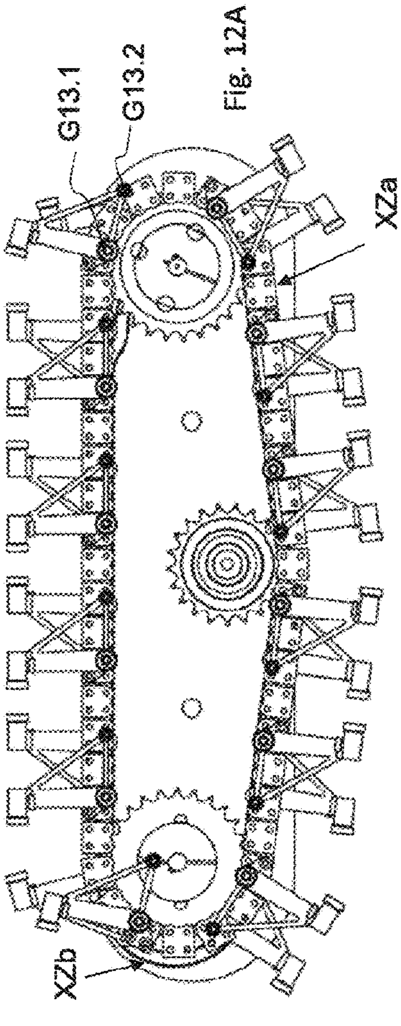

In FIG. 6A, 10A, 11C, a contact point distance Δd provided by different protruding distances d1, d2 of the suspension element's contact point P13 and of the counter bearing's contact point (free end, especially wheel/pulley) is illustrated by referring to the relative arrangement at the (ceiling) structure, respectively.

Figure 17:
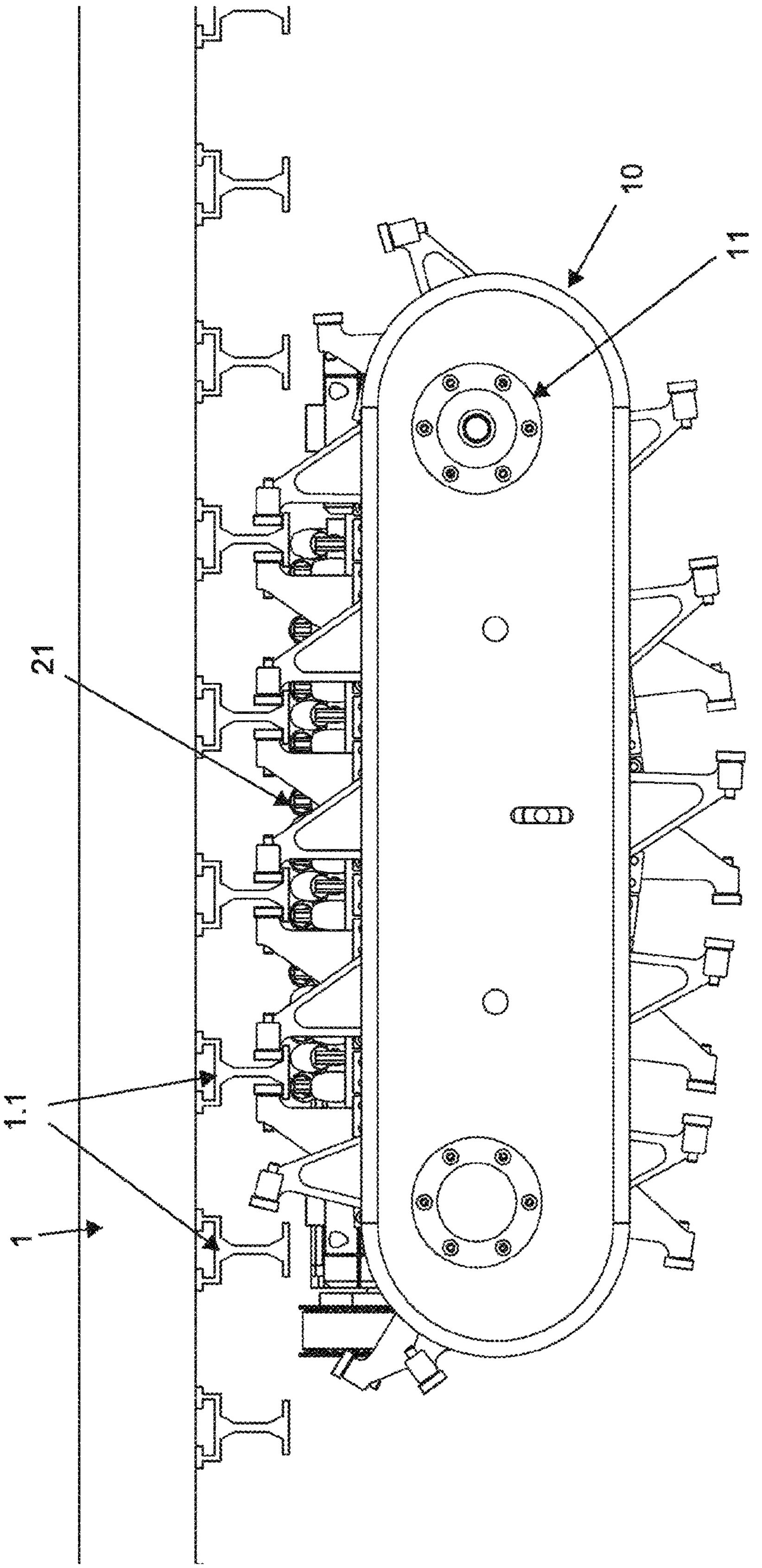
FIG. 17 shows the side view shown in FIG. 6 of a ceiling vehicle according to embodiments.

FIG. 17 shows a side view of an embodiment of a ceiling vehicle 10 hanging in a structure 1 according to the invention. The ceiling vehicle 10 is coupled to the structure 1 via its suspension elements 13, as described in FIGS. 6A and 6B. Additionally, a holonomic wheelset 21.2 consisting of a plurality of coaxially aligned holonomic wheels 21.1 can be seen. The holonomic wheels exhibit a plurality of equally distributed rollers around their circumference, which allow them to move passively in the direction of the first drive units and allow active traveling in the second direction when they are actively rotated along the axis of the holonomic wheelset 21.2.

Figure 18:
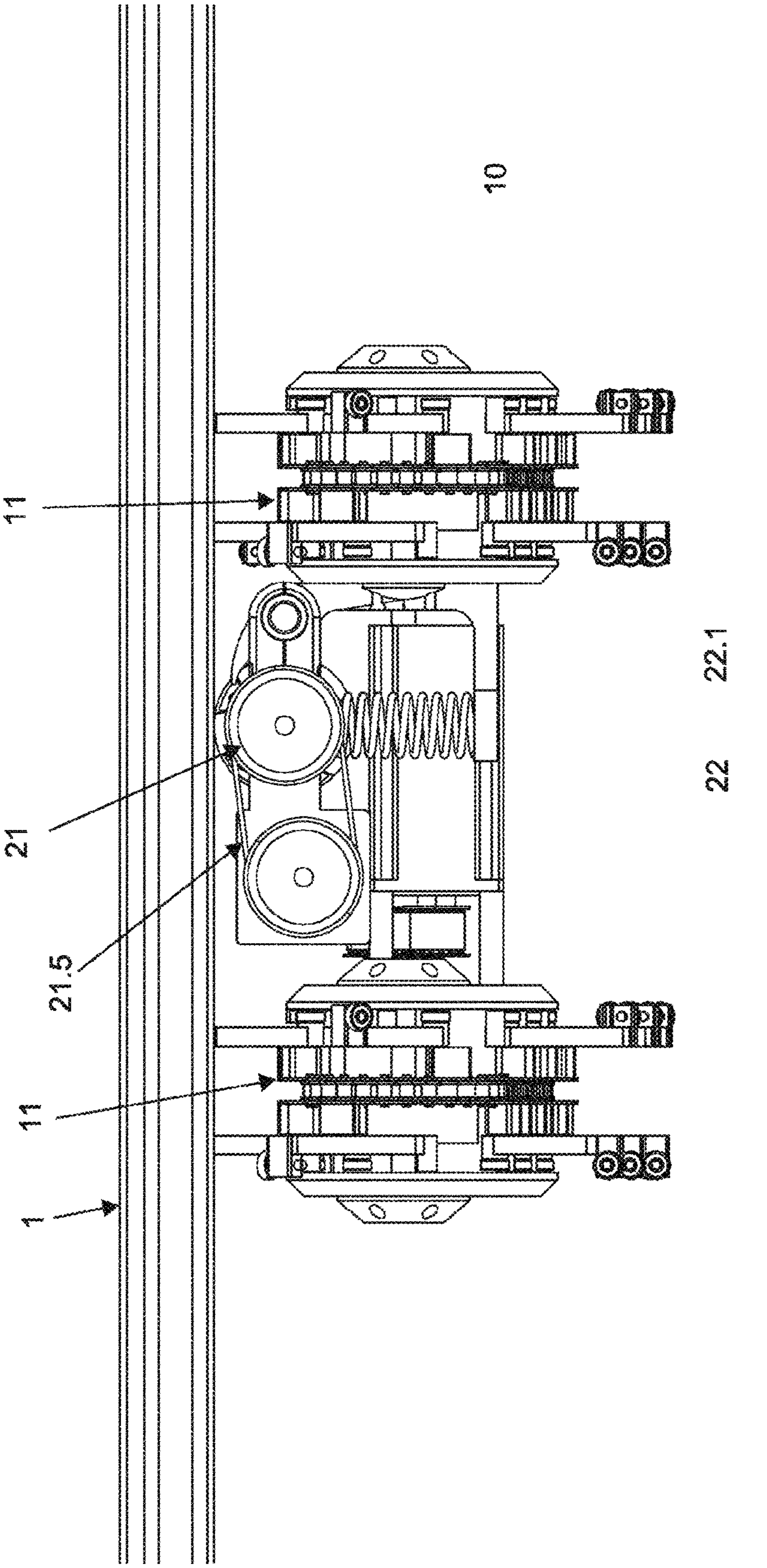
FIG. 18 shows a view from the back of the ceiling vehicle in FIG. 17.

A front view of the ceiling vehicle 10 can be seen in FIG. 18. The ceiling vehicle 10 comprises a return mechanism 22 with a spring 22.1 that pushes the holonomic wheelset 21.2 against the structure 1 to ensure a good traction. A motor 27 powering the second drive unit and holonomic wheel 21.1 can also be seen.

Figure 19:
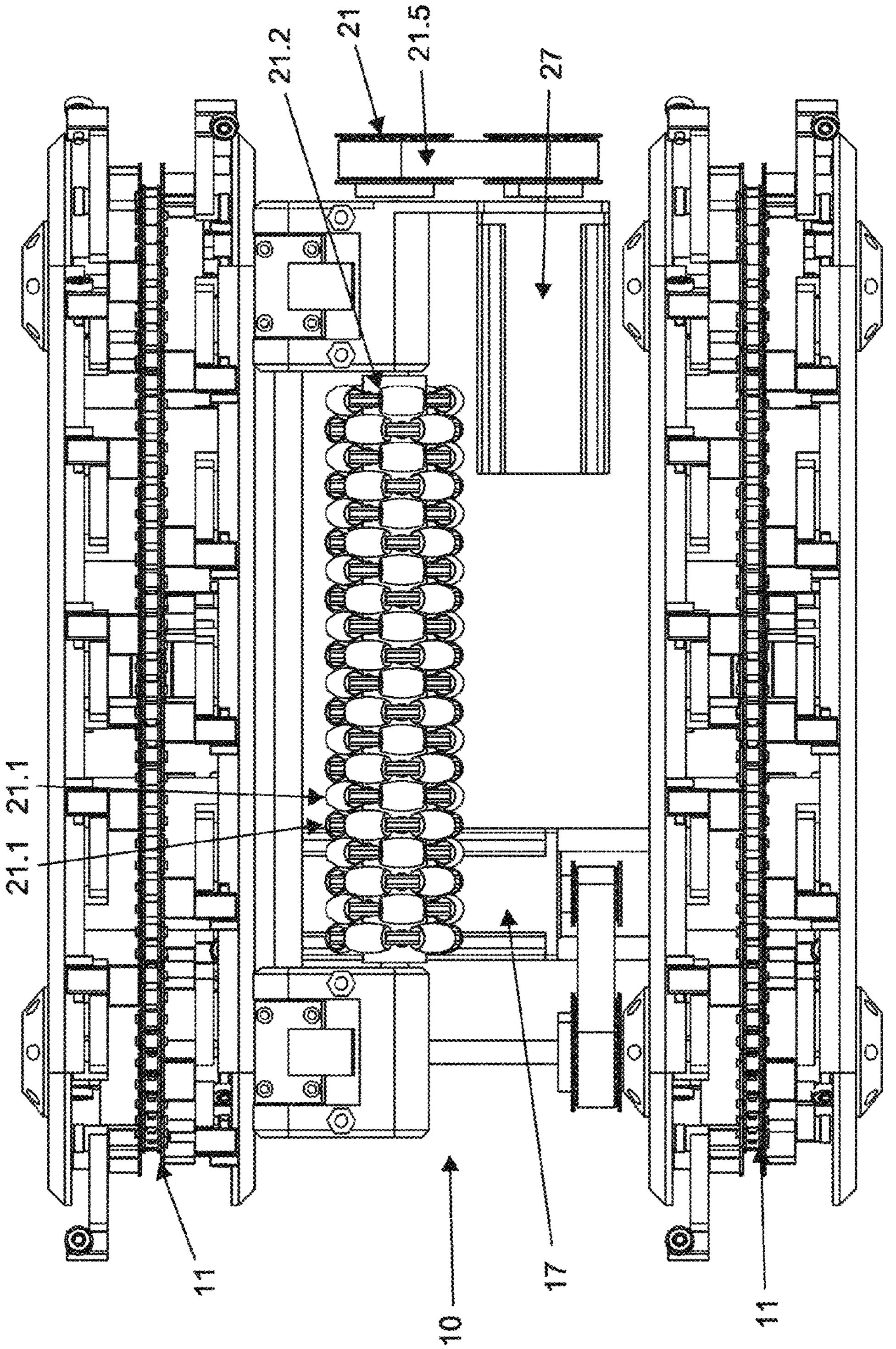
FIG. 19 shows a top view of the ceiling vehicle in FIG. 17.
Figure 20:
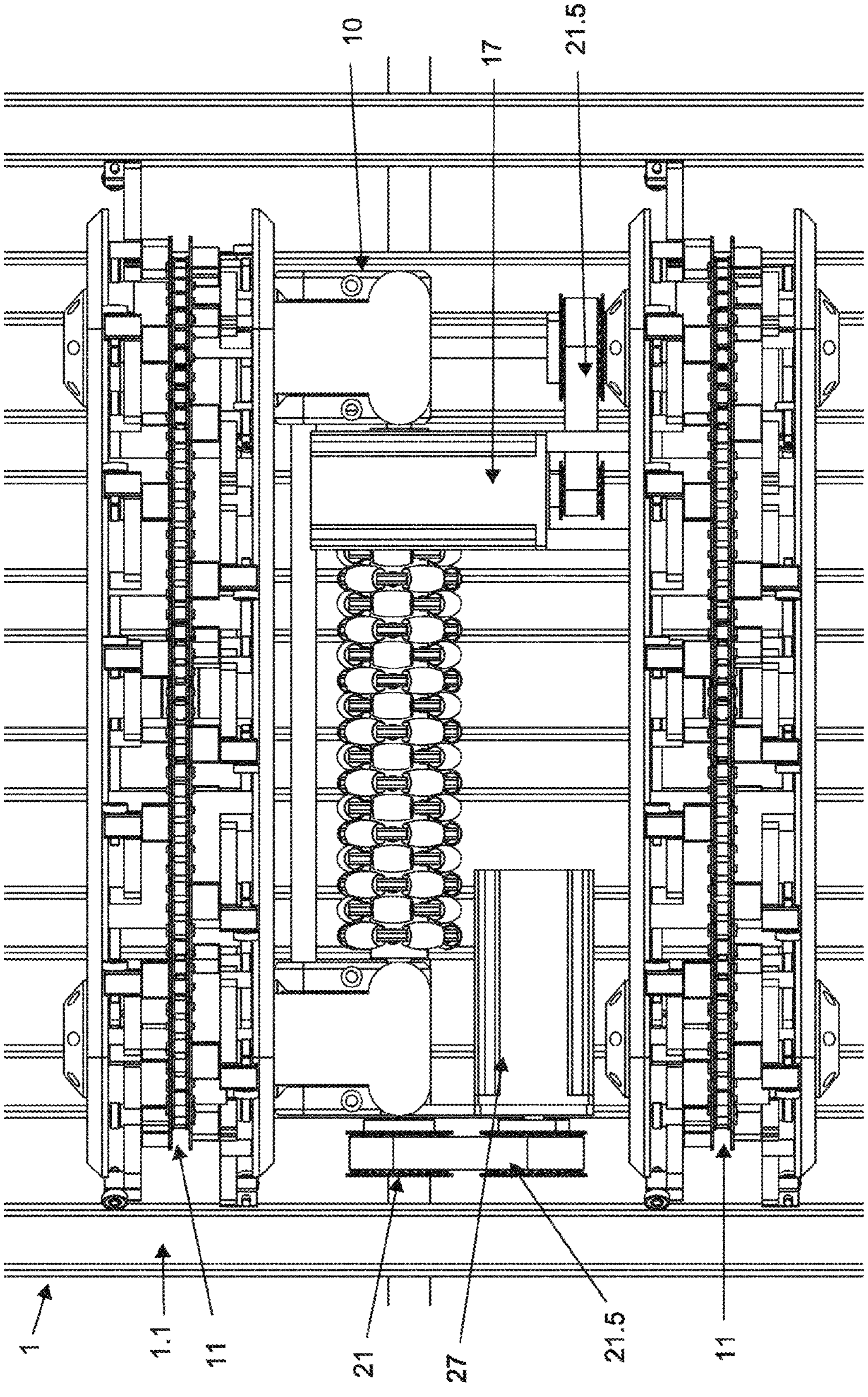
FIG. 20 shows a bottom view of the ceiling vehicle in FIG. 17.

FIG. 19 shows a top view of the ceiling vehicle 10. A first motor 17 connected to the first drive units 11, as well as a second motor 27 connected to the second drive unit 21 and the holonomic wheel 21.1, are shown. The two motors 17, 27 can be controlled individually via a control unit, such that the ceiling vehicle 10 is configured for omnidirectional movement along the structure 1. A bottom view of the ceiling vehicle 10 is shown in FIG. 20.

Figure 21:
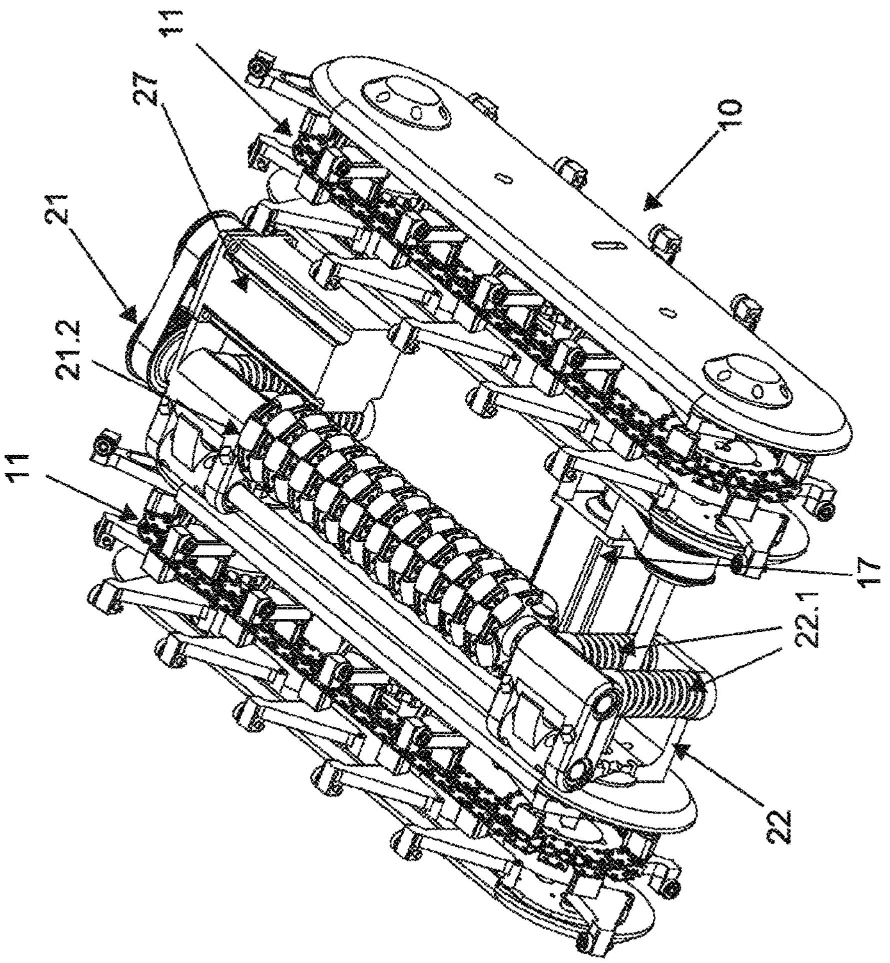
FIG. 21 shows a perspective view of the ceiling vehicle in FIG. 17.
Figure 22:
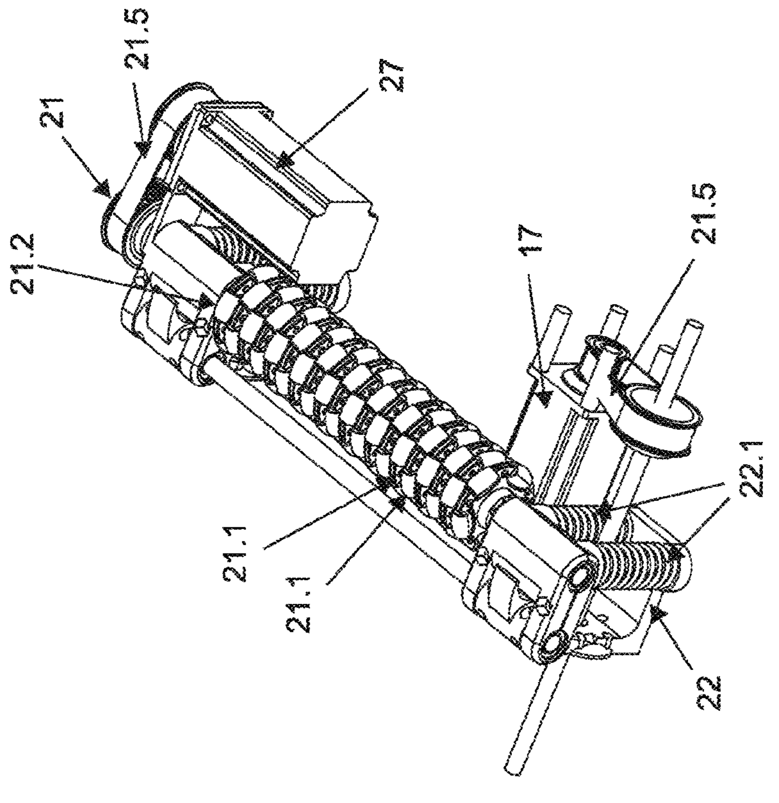
FIG. 22 shows a detail of components (second drive unit) of the ceiling vehicle in FIG. 17.
Figure 23:
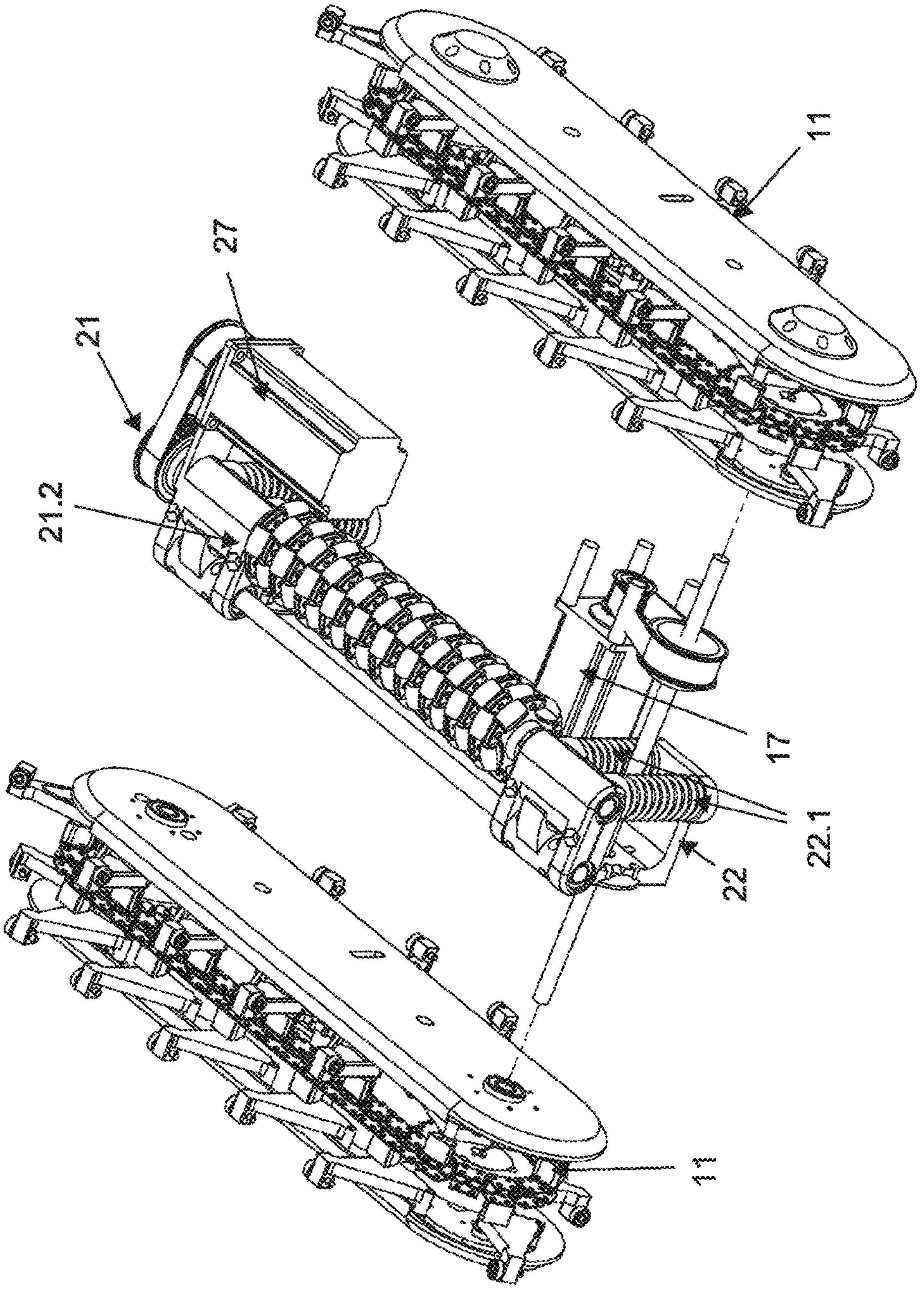
FIG. 23 shows an exploded view of components (first drive units and a second drive unit) of a vehicle according to embodiments, especially according to the embodiment shown in FIG. 17.

With FIGS. 21, 22, and 23 the configuration of the ceiling vehicle 10 is described. The ceiling vehicle 10 comprises two first drive units and a second drive unit 21 configured for enabling locomotion of the ceiling vehicle 10. The second drive unit 21 with the holonomic wheel 21.1 is shown in FIG. 22. The first motor 17 is shown below the holonomic wheel 21.1 and is connected to the belt 21.5 to drive the first drive units 11. The second motor 27 is arranged in parallel to the holonomic wheel 21.1 and connected to it via a second belt 21.5. The return mechanism 22 ensures grip of the holonomic wheel 21.1 with the structure 1. The vehicle 10 is able to actively move in two spatial directions, the first spatial direction being predefined by the structure 1 and a second spatial direction being defined by the guiding/driving motion of the two first drive units. The exploded view in FIG. 23 shows how the components are connected.

Figure 24A:
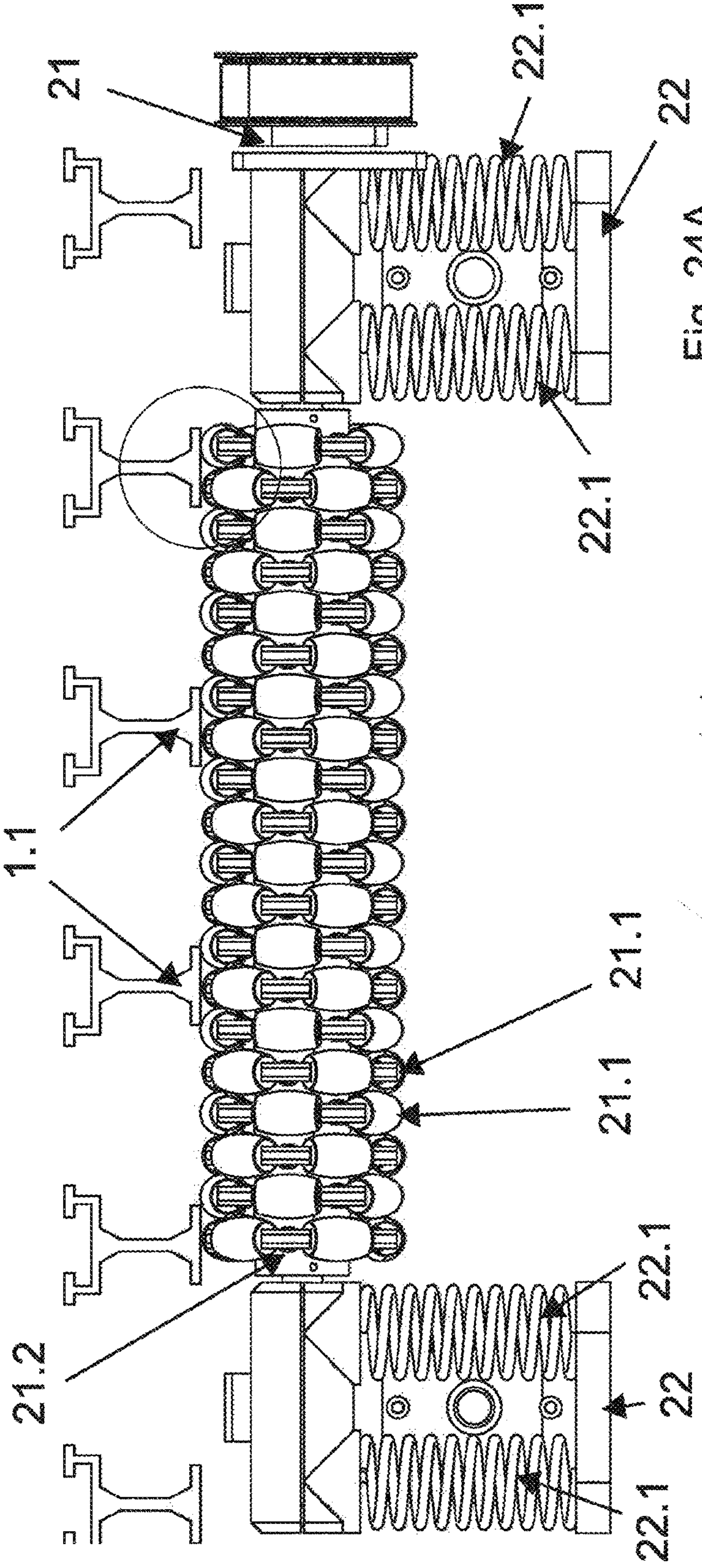
FIGS. 24A, 24B show a detail of components (first drive units and a second drive unit) of a vehicle according to embodiments, especially according to the embodiment shown in FIG. 17.
Figure 24B:
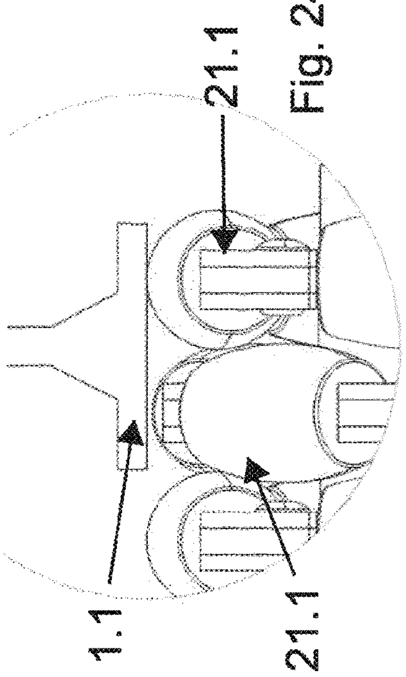
Figure 25:
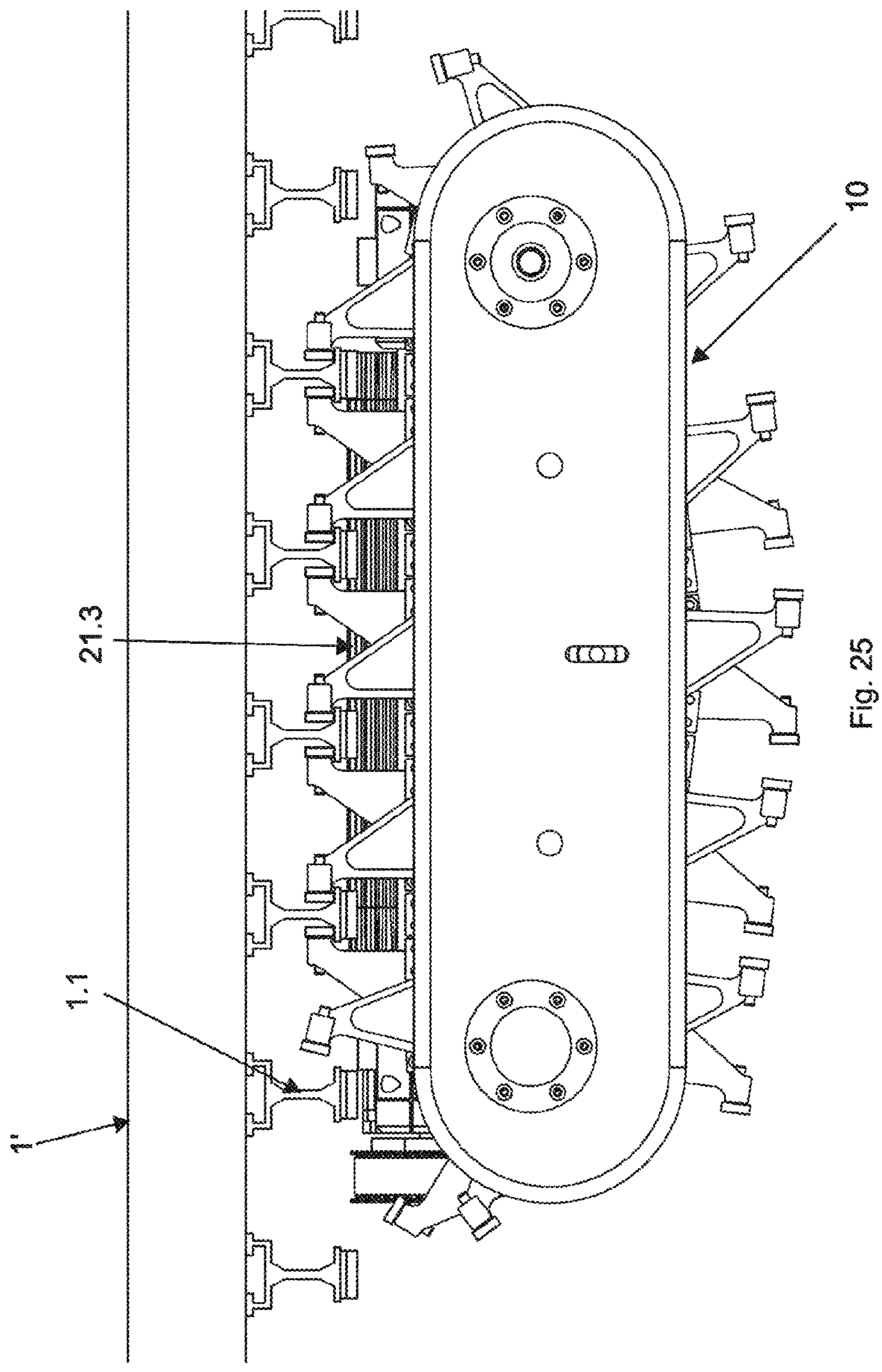
FIG. 25 shows the side view as in FIG. 6 of a ceiling vehicle according to further embodiments.

FIGS. 24A and 24B shows the holonomic wheel 21.1 in contact with the structure 1. The contact is enhanced by the return mechanism 22 on both ends of the holonomic wheel 21.1. The close up view in FIG. 24B shows the preferred configuration in which at least two holonomic wheel 21.1 of the holonomic wheel 21.1 are in contact with the T-profile 1.1 of the structure 1. Additionally, each holonomic wheel 21.1 has an offset in azimuthal direction in relation to its adjacent holonomic wheels 21.1.

Figure 26:
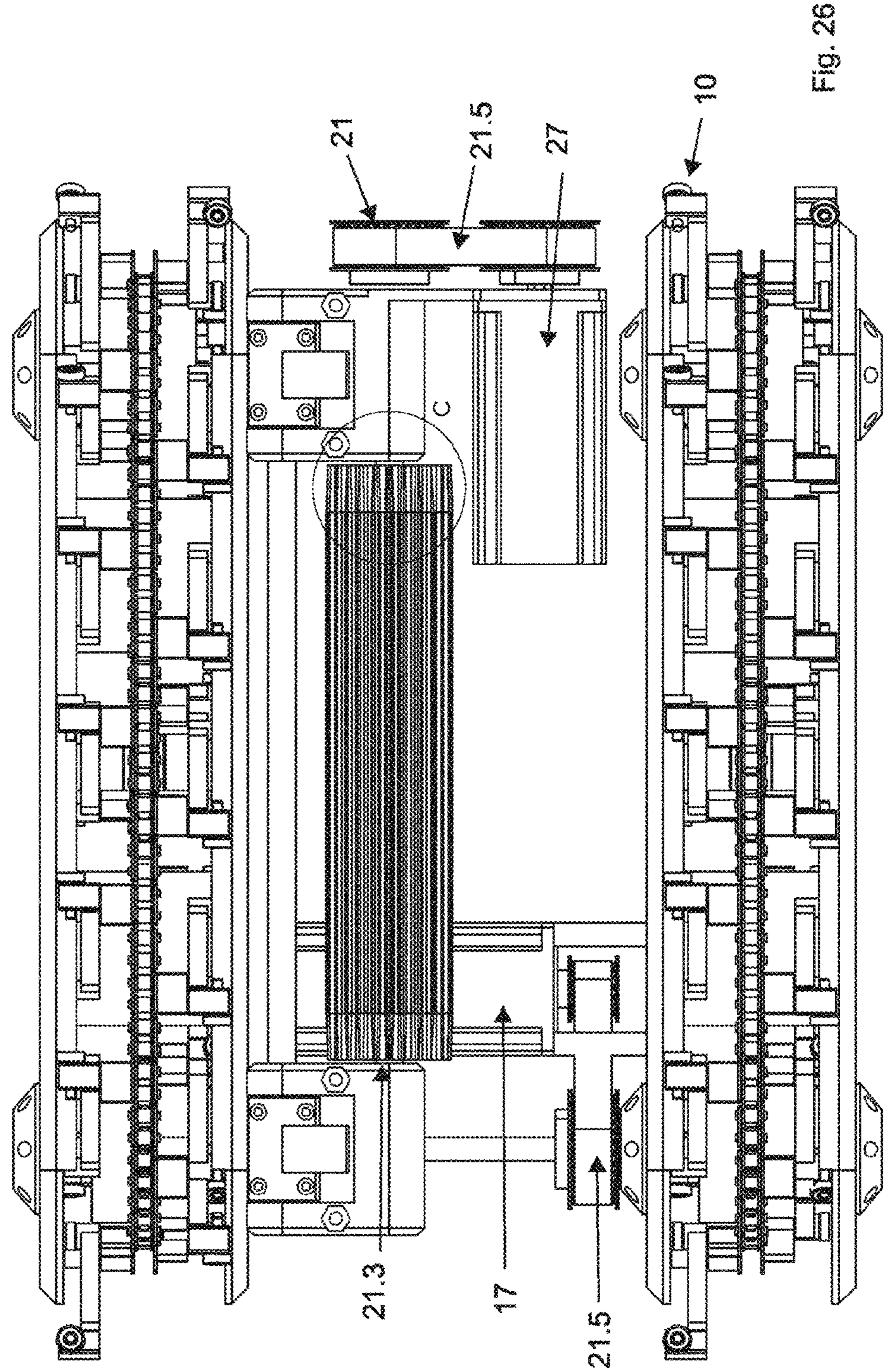
FIG. 26 shows a top view of the ceiling vehicle in FIG. 25.
Figure 27:
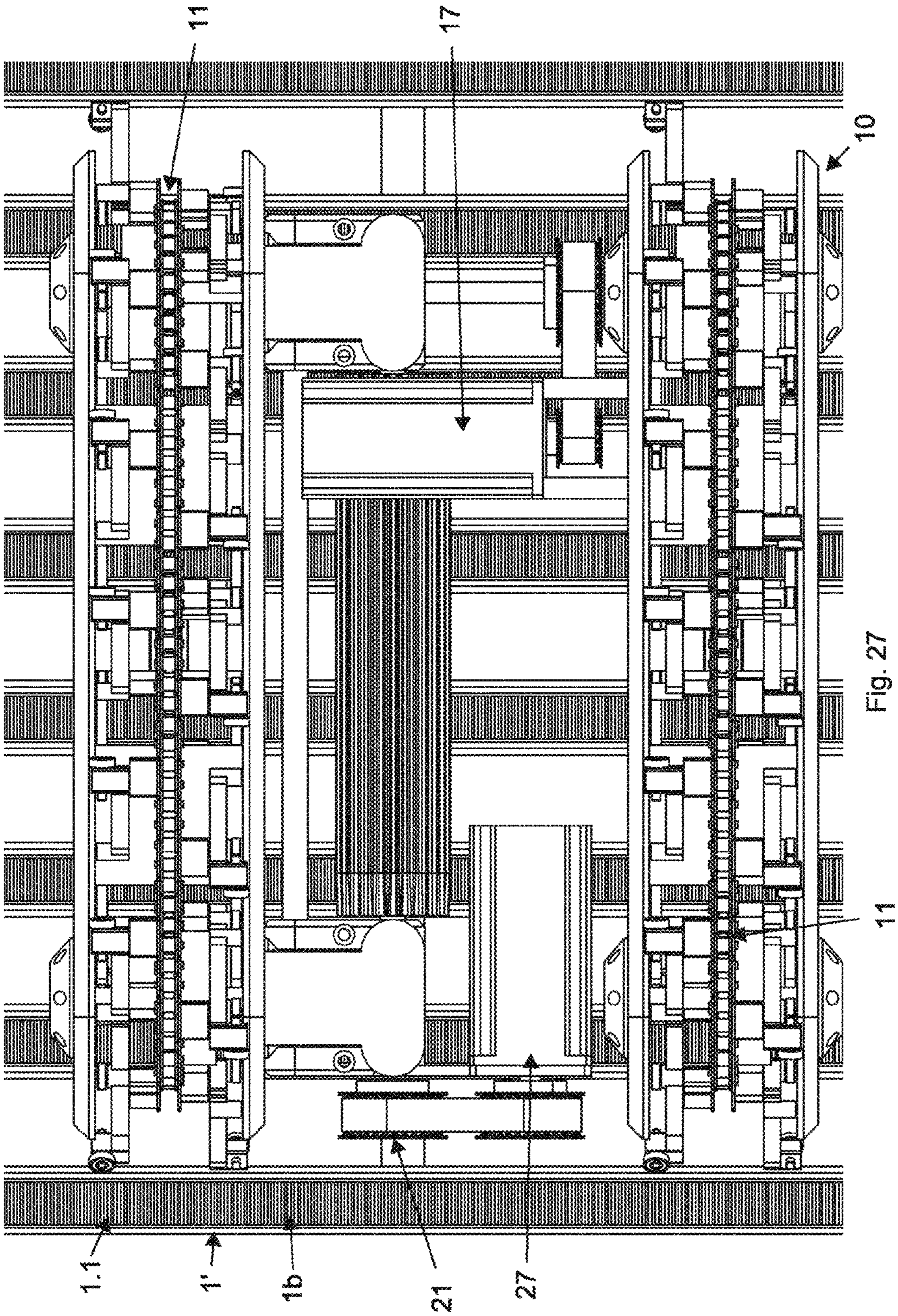
FIG. 27 shows a bottom view of the ceiling vehicle in FIG. 25.
Figure 28:
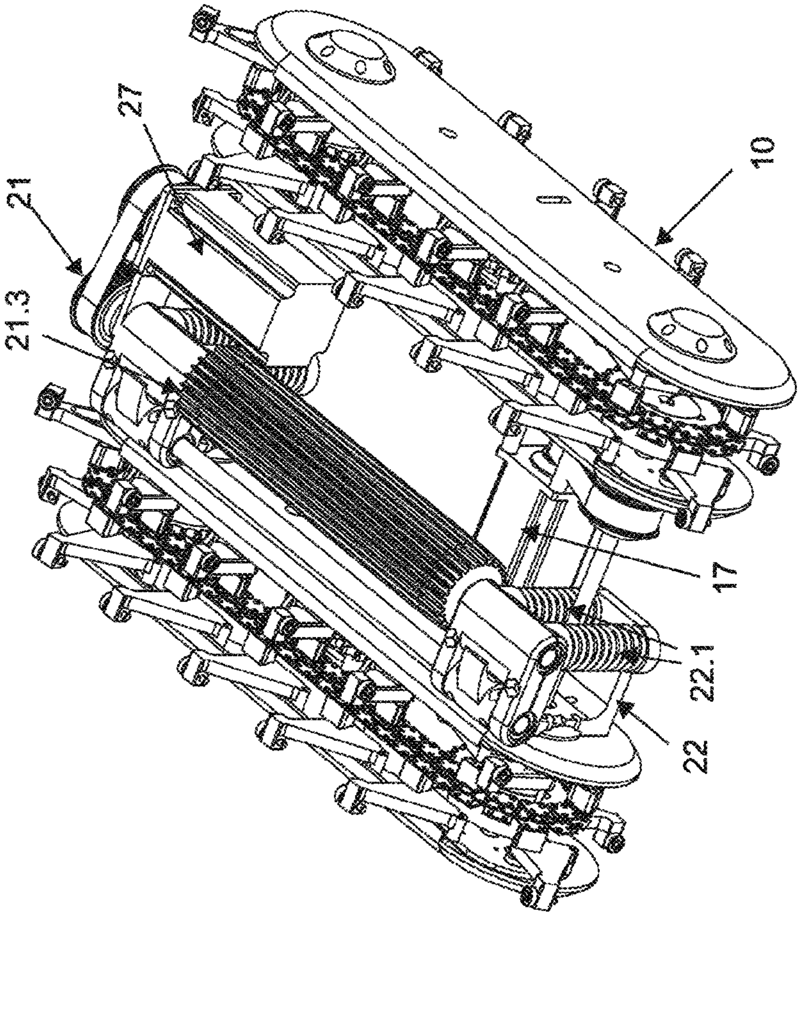
FIG. 28 shows a perspective view of the ceiling vehicle in FIG. 25.

FIGS. 25, 26, 27, and 28 show a vehicle 10 according to a further embodiment, wherein the second drive unit 21 comprises an elongated gearing wheel 21.3, or spur gear, for form fit coupling with a structure 1'. The structure 1' exhibits an additional raster 1*b* on the bottom side of the T-profiles 1.1. Preferably, the spur gear 21.3 is fixed at a predefined height. However, an optional return mechanism 22 is also shown. The bottom side of the T-profiles 1.1 is depicted in FIG. 27. The additional raster 1*b* corresponds to the teeth of the spur gear 21.3. The vehicle 10 also has two motors 17, 27 for actively driving in two directions: a first motor 17 for driving the first drive units 11 and moving the vehicle 10 orthogonal to the structure 1', and a second motor 27 for driving the second drive unit and moving the vehicle 10 along the T-profiles 1.1.

Figure 29A:
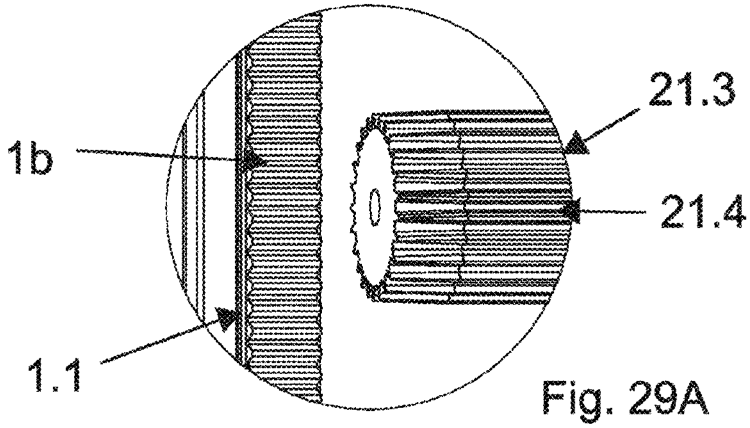
FIG. 29A, 29B, 29C show a close up view of the interaction of the ceiling vehicle in FIG. 25 with the structure.
Figure 29B:
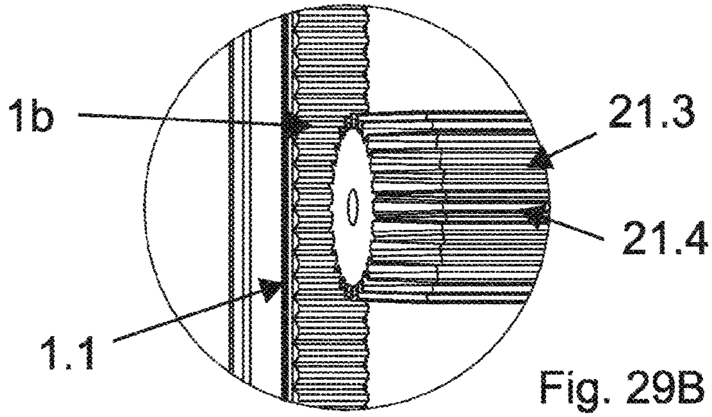
Figure 29C:
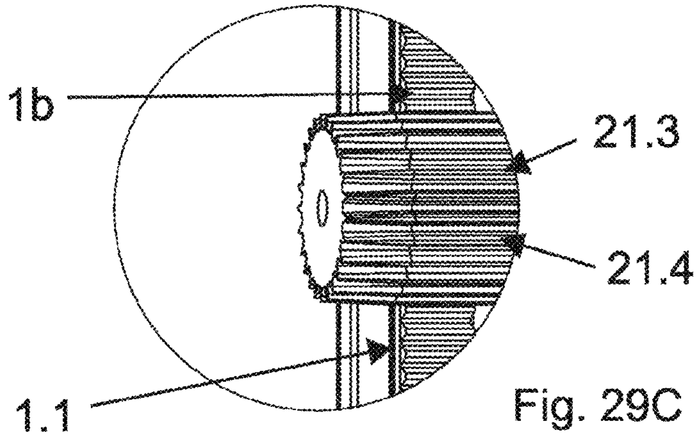

When the vehicle 10 moves orthogonal to the structure 1' (in the second spatial direction) the teeth 21.4 of the spur gear 21.3 slide into/out of the additional raster 1*b* of the structure 1'. In FIGS. 29A, 29B, and 29C, the section C in FIG. 26 is enlarged and the process of sliding into the additional raster 1*b* is depicted. The teeth 21.4 are tapered at the ends to allow a smooth transition into the additional raster 1*b*.

The embodiments shown here are only examples of the present invention and must therefore not be understood as limiting. Alternative embodiments contemplated by the skilled person are equally encompassed by the scope of protection of the present invention.

LIST OF REFERENCE SIGNS

1 structure, e.g. ceiling structure
1' structure, e.g. ceiling structure
1*a* raster defined by the structure
1*b* additional raster
1.1 profile rail, especially T-profile resp. T-rail
1.2 wheel tread
1.3 power rail
10 vehicle, especially ceiling vehicle
11 first drive unit (especially crawler track-like)

11.1 drive mechanism
11.2 lateral area resp. surface shell of the drive unit(s)
**11*a*** first drive unit, especially chain drive unit
**11*b*** further first drive unit
**11*c*** further first drive unit
12 circumferential track
**12*a*** first circumferential track, especially comprising a chain
**12*b*** second circumferential track
**12*p*** parallel section/linear section of the track
**12*r*** redirection section/curved section of the track
13 suspension element resp. chain element
**13*b*** further suspension element
13.1. 13.2 first pulley, second pulley
13.3 wheel
13.4 current collector resp. power-slider (conductive slider for energy transfer)
13.5 lever arm
13.6 protruding section/suspension arm
13.7 protruding axial section (guiding bolt or shaft)
14 guiding plank or rail
15 longitudinal connecting element, especially chain element
**15*a*** closed loop of interrelated suspension elements, especially chain
16 counter bearing
16.1 wheel, pulley
17 first motor or actuator
18 gear unit
**18*a*** further gear unit
**18*b*** chain tensioning device
19 energy storage unit
20 de-/coupling kinematics
**20*a*** vertical motion kinematics
**20*b*** non-circular pivot motion kinematics
21 second drive unit
21.1 holonomic wheel
21.2 holonomic wheelset
21.3 spur gear
21.4 teeth
21.5 belt
22 return mechanism
22.1 spring
27 second motor
30 control unit
40 sensor arrangement
50 hoist unit
51 traction mechanism, especially rope winch
53 transmission means, especially rope
100 crawler type (ceiling) vehicle arrangement
Cr instantaneous centre of rotation
d1 protruding distance of the suspension element's contact point
d2 protruding distance of a/the counter bearing's contact point
Δd contact point distance
G13.1 first guiding point or axis (coupling the first track and the suspension element)
G13.2 second guiding point or axis (coupling the second track and the suspension element)
P13 contacting/bearing point/area of the suspension element with the ceiling structure
X13.1 first pulley axis
X13.2 second pulley axis
XZa shape/contour of the first circumferential track
XZb shape/contour of the second circumferential track
Y13.3 wheel axis
y**12*a*** predefined first longitudinal positions
y**12*b*** predefined second longitudinal positions
y13 longitudinal extension of lever arm
x first spatial direction, especially direction of longitudinal extension of T-profiles
y second spatial direction, especially longitudinal direction or driving direction
z third spatial direction, especially vertical direction

What is claimed is:

1. A crawler type vehicle configured for traveling in a suspended manner headlong at a ceiling structure, wherein the vehicle comprises:

a plurality of suspension elements configured for suspending the vehicle and configured for coupling the vehicle to the structure;

at least one first drive unit configured for circumferential motion and accommodating a first circumferential track and a second circumferential track having a different circumferential shape than the first circumferential track, wherein the suspension elements are attached to the first circumferential track at predefined first longitudinal positions corresponding to a predefined raster, wherein the vehicle is configured for moving along the structure by decoupling a subset of the plurality of suspension elements from and coupling them into the structure when the suspension elements are guided along the two circumferential tracks by the circumferential motion;

at least one second drive unit configured for enabling locomotion of the vehicle in at least two spatial directions, namely a first spatial direction being predefined by the structure and a second spatial direction being defined by the guiding motion of the at least one first drive unit, wherein the second spatial direction is orthogonal to the first spatial direction, wherein the at least one second drive unit is configured for locomotion of the vehicle in the first spatial direction providing for at least two-dimensional locomotion capability of the vehicle, wherein the respective suspension element exhibits at least one wheel which is arranged and configured for being guided along the structure; and at least two individually controllable motors, wherein the at least one first drive unit and the at least one second drive unit are connected to at least one motor, and wherein the motor for the at least one first drive unit and the at least one second drive unit are different, providing for active two-dimensional traveling capability of the vehicle.

2. The crawler type vehicle according to claim 1, wherein the at least one first drive unit of the crawler type vehicle is configured for enabling a closed loop trajectory of the suspension elements;

wherein the first and second circumferential tracks are shaped in such a manner that the suspension elements are coupled to and decoupled from the structure only when passing a curved section of the tracks;

wherein the suspension elements are fixedly coupled by means of a first pulley to the first circumferential track, wherein the suspension elements are guided within the second circumferential track by means of a second pulley respectively, wherein the first and second pulleys preferably are arranged at a lever arm of the respective suspension element, wherein the respective suspension element preferably has an L-shape;

wherein each suspension element exhibits a first pulley and a second pulley arranged in longitudinal distance with respect to the first pulley at a lever arm of the respective suspension element, wherein the suspension element is coupled to the first and second tracks via the first and second pulleys;

wherein each suspension element exhibits a lever arm supporting the second pulley guided by the second track, wherein the second pulley is arranged at a free end of the lever arm, and wherein in a linear section of the track, the lever arm is pointing in the driving direction;

wherein the suspension elements are connected to each other by means of longitudinal connecting elements, thereby forming a closed loop of interrelated suspension elements distanced to each other in the predefined raster;

wherein the first circumferential track exhibits a chain or is defined by a chain forming a closed loop of interrelated chain elements connecting the suspension elements, wherein the vehicle exhibits a plurality of counter bearings, wherein the plurality of counter bearings are preferably coupled to the first circumferential track;

wherein the vehicle exhibits a further first drive unit accommodating further circumferential tracks, wherein a plurality of further suspension elements are attached to the further circumferential tracks in predefined longitudinal positions corresponding to the predefined raster and are configured for suspending the vehicle and for coupling the vehicle to the structure, wherein the vehicle exhibits further suspension elements which are attached to further circumferential tracks, wherein the suspension elements and the further suspension elements momentarily engaging the structure are securing the vehicle at the structure with respect to the driving direction and opposite thereto;

wherein the vehicle exhibits a further drive unit which exhibits the same configuration as the at least one first drive unit but with mirror-inverted arrangement of the further suspension elements and further circumferential tracks, wherein the further suspension elements are guided in a direction opposite to the guiding direction of the suspension elements of the at least one first drive unit, wherein both the respective suspension elements and further suspension elements are simultaneously coupling to and decoupling from the structure;

wherein the at least one first drive unit is configured for lifting the respective suspension elements out of the structure in an unloaded state, wherein the at least one first drive unit provides for both coupling and decoupling kinematics for a subset of momentarily unloaded suspension elements and suspension of the vehicle by a subset of momentarily loaded suspension elements at the same time;

wherein the at least one first drive unit has a substantially plane configuration;

wherein the vehicle exhibits at least two first drive units arranged in parallel to each other;

wherein the circumferential tracks are respectively guided in a plane, extending in two-dimensional manner;

wherein the at least one first drive unit is coupled by means of at least three suspension elements; and wherein the respective suspension element has an L-shape which provides for two arms defining the relative arrangement of the at least one wheel and first and second pulleys of the respective suspension element.

3. The crawler type vehicle according to claim 1, wherein the at least one second drive unit comprises at least one holonomic wheel.

4. The crawler type vehicle according to claim 3, wherein the at least one holonomic wheel is disc shaped and comprises a plurality of equally distributed rollers around its circumference.

5. The crawler type vehicle according to claim 3, wherein the at least one holonomic wheel is further defined as a holonomic wheelset consisting of at least two coaxially arranged holonomic wheels.

6. The crawler type vehicle according to claim 5, wherein each of the coaxially arranged holonomic wheels has a predefined offset in the azimuthal direction in respect to their adjacent holonomic wheels.

7. The crawler type vehicle according to claim 3, wherein the at least one holonomic wheel is connected to a return mechanism that applies a force to the holonomic wheel pressing it against the structure.

8. The crawler type vehicle according to claim 1, wherein the at least one second drive unit comprises at least one wide elongated gearing wheel for meshing with a defined raster in the second spatial direction.

9. The crawler type vehicle according to claim 8, wherein the at least one wide elongated gearing wheel is tapered at the ends.

10. The crawler type vehicle according to claim 1, further comprising a structure exhibiting a plurality of profiles defining the raster of the structure, wherein the suspension elements are configured for being guided along the profiles in a first spatial direction being defined by the structure, the vehicle's traveling motion having at least two degrees of freedom; and wherein the structure exhibits a plurality of first profiles defining the raster of the structure, wherein the vehicle exhibits a plurality of further suspension elements suspending the vehicle together with the suspension elements, wherein the suspension elements and the further suspension elements secure the vehicle at the structure with respect to the driving direction.

11. The crawler type vehicle according to claim 10, wherein the plurality of profiles each exhibit second profiles defining a raster of the structure in a second spatial direction, wherein the suspension elements are configured for being guided along the plurality of first profiles in the first spatial direction being defined by the structure, the vehicle's traveling motion having at least two degrees of freedom, and wherein a gearing wheel is configured for meshing with the second profiles, such that the crawler type vehicle can move omnidirectionally via the at least two individually controllable motors and drive units.

12. A method of hanging a crawler type vehicle from a structure for traveling in a suspended manner headlong the structure, the method comprising the steps of:

suspending the vehicle by means of a plurality of suspension elements coupling the vehicle to the structure;

defining a circumferential guiding motion by first and second circumferential tracks having different circumferential shapes;

attaching the suspension elements to the first circumferential track at predefined first longitudinal positions corresponding to a raster defined by the structure, wherein the vehicle is suspended such that it can move along the structure by decoupling a subset of the plurality of suspension elements from and coupling them into the structure when the suspension elements are guided along the circumferential tracks by the circumferential motion; and transmitting the circumferential motion by the suspension elements momentarily engaging the structure;

wherein the circumferential motion is provided by first drive units, wherein at least two motors power the at least one first drive unit and at least one second drive unit enabling active two-dimensional travel of the crawler type vehicle.

13. The method according to claim 12, further comprising a computer and a computer program comprising instructions which, when executed by the computer, cause the computer to execute steps of the method in context with provision and control of the circumferential guiding motion by controlling the first motor connected to the at least one first drive unit and controlling the second motor connected to the at least one second drive unit.

* * * * *